United States Patent
Jung et al.

(10) Patent No.: US 10,863,457 B2
(45) Date of Patent: Dec. 8, 2020

(54) APPARATUS AND METHOD FOR CONTROLLING ANTENNAS IN WIRELESS COMMUNICATION SYSTEM

(71) Applicant: Samsung Electronics Co., Ltd., Suwon-si (KR)

(72) Inventors: Doyoung Jung, Suwon-si (KR); Sangkyou Ryou, Suwon-si (KR); Daehoon Kim, Suwon-si (KR); Varun Vanama, Suwon-si (KR); Ingil Baek, Suwon-si (KR); Junhee Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/265,480

(22) Filed: Feb. 1, 2019

(65) Prior Publication Data

US 2019/0246364 A1 Aug. 8, 2019

Related U.S. Application Data

(60) Provisional application No. 62/626,907, filed on Feb. 6, 2018.

(30) Foreign Application Priority Data

Aug. 13, 2018 (KR) .......................... 10-2018-0094482

(51) Int. Cl.
*H04W 52/52* (2009.01)
*H04B 7/06* (2006.01)
(Continued)

(52) U.S. Cl.
CPC .......... *H04W 52/52* (2013.01); *H04B 7/0608* (2013.01); *H04B 7/0617* (2013.01); *H04B 7/0404* (2013.01); *H04W 88/02* (2013.01)

(58) Field of Classification Search
CPC ....... H01Q 1/243; H01Q 21/28; H04B 7/0689
(Continued)

(56) References Cited

U.S. PATENT DOCUMENTS 10,038,486 B2 * 7/2018 Kim ...................... H04B 7/0602
10,284,244 B1 * 5/2019 Kulkarni .................. H04B 1/18
(Continued)

FOREIGN PATENT DOCUMENTS

KR 10-2017-0098109 A 8/2017

OTHER PUBLICATIONS

International Search Report dated May 8, 2019; International Application No. #: PCT/KR2019/001472.

*Primary Examiner* — Tan H Trinh
(74) *Attorney, Agent, or Firm* — Jefferson IP Law, LLP

(57) ABSTRACT

The disclosure relates to a pre-$5^{th}$-Generation (5G) or 5G communication system to be provided for supporting higher data rates Beyond $4^{th}$-Generation (4G) communication system such as long-term evolution (LTE). A method of operating a terminal in a wireless communication system and an apparatus therefor are provided. The method includes detecting one or more states associated with antennas arranged in the terminal, activating a first antenna, among the antennas, based on the one or more states associated with antennas and deactivating a second antenna, among the antennas, based on the one or more states associated with the antennas.

20 Claims, 36 Drawing Sheets

(51) Int. Cl.
*H04W 88/02* (2009.01)
*H04B 7/0404* (2017.01)

(58) Field of Classification Search
USPC .......... 455/41.1, 41.2, 69, 39, 73, 90.2, 522; 375/299
See application file for complete search history.

(56) References Cited

U.S. PATENT DOCUMENTS

| | | | | |
|---|---|---|---|---|
| 2008/0039015 A1* | 2/2008 | Nakata | ............... | H04B 7/08 455/39 |
| 2009/0135081 A1* | 5/2009 | Imura | ............... | H01Q 1/242 343/876 |
| 2012/0046003 A1* | 2/2012 | Ying | ............... | H04B 1/406 455/90.2 |
| 2012/0184228 A1 | 7/2012 | Mujtaba et al. | | |
| 2012/0309326 A1* | 12/2012 | Maguire | ............... | H04B 5/02 455/73 |
| 2012/0320803 A1* | 12/2012 | Skarp | ............... | H04B 7/0404 370/277 |
| 2013/0244665 A1 | 9/2013 | Clevorn et al. | | |
| 2013/0308554 A1* | 11/2013 | Ngai | ............... | H04B 1/44 370/329 |
| 2013/0310109 A1* | 11/2013 | Filipovic | ............... | H01Q 3/24 455/553.1 |
| 2014/0132465 A1 | 5/2014 | Sanchez et al. | | |
| 2014/0148095 A1* | 5/2014 | Smith | ............... | H04B 5/02 455/41.1 |
| 2014/0192927 A1* | 7/2014 | Kim | ............... | H04B 7/0689 375/299 |
| 2015/0296460 A1* | 10/2015 | Lee | ............... | H04B 1/3838 455/522 |
| 2016/0253651 A1* | 9/2016 | Park | ............... | G07F 9/023 705/39 |
| 2017/0118323 A1* | 4/2017 | Kim | ............... | H04W 4/80 |
| 2017/0195106 A1* | 7/2017 | Pehlke | ............... | H04B 1/38 |
| 2017/0222735 A1* | 8/2017 | Kawamura | ............... | H04B 17/102 |
| 2017/0244456 A1* | 8/2017 | Kim | ............... | H04B 7/0602 |
| 2017/0356980 A1* | 12/2017 | Islam | ............... | G01S 5/02 |
| 2017/0359113 A1 | 12/2017 | Lee et al. | | |
| 2018/0026373 A1 | 1/2018 | Schwent et al. | | |
| 2018/0184388 A1* | 6/2018 | Kam | ............... | H03F 1/0211 |
| 2019/0037574 A1* | 1/2019 | Lee | ............... | H04W 52/42 |

* cited by examiner

APPARATUS AND METHOD FOR CONTROLLING ANTENNAS IN WIRELESS COMMUNICATION SYSTEM

CROSS-REFERENCE TO RELATED APPLICATION(S)

This application is based on and claims priority under 35 U.S.C. § 119(e) of a U.S. Provisional application Ser. No. 62/626,907, filed on Feb. 6, 2018, in the U.S. Patent and Trademark Office, and under 35 U.S.C. § 119(a) of a Korean patent application number 10-2018-0094482, filed on Aug. 13, 2018, in the Korean Intellectual Property Office, the disclosure of each of which is incorporated by reference herein in its entirety.

BACKGROUND

1. Field

The disclosure relates to a wireless communication system. More particularly, the disclosure relates to an apparatus and method for controlling antennas in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Terminals can perform beam forming using an antenna array. For more effective beamforming, terminals may include a plurality of antenna arrays. In this configuration, there is a need for a method for effectively operating the antenna arrays.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for effectively controlling antennas in a wireless communication system.

Another aspect of the disclosure is to provide an apparatus and method for selectively activating antennas in a wireless communication system.

Another aspect of the disclosure is to provide an apparatus and method for reducing a power consumption amount of a plurality of antennas in a wireless communication system.

Another aspect of the disclosure is to provide an apparatus and method for selecting an appropriate antenna subset using sensor data in a wireless communication system.

Another aspect of the disclosure is to provide an apparatus and method for selecting an appropriate antenna subset based on the result of measuring beams in a wireless communication system.

Additional aspects will be set forth in part in the description which follows and, in part, will be apparent from the description, or may be learned by practice of the presented embodiments.

In accordance with an aspect of the disclosure, a method of operating a terminal in a wireless communication system is provided. The method includes detecting one or more states associated with a plurality of antennas arranged in the terminal, activating a first antenna, among the plurality of antennas, based on the one or more states associated with plurality of antennas and deactivating a second antenna, among the plurality of antennas, based on the one or more states associated with plurality of antennas.

In accordance with another aspect of the disclosure, a terminal in a wireless communication system is provided. The terminal includes a plurality of antennas, a transceiver configured to be connected with the plurality of antennas and at least one processor connected with the transceiver. The at least one processor is configured to detect one or more states associated with the plurality of antennas, activate a first antenna, among the plurality of antennas, based on the one or more states associated with the plurality of antennas, and deactivate a second antenna, among the plurality of antennas, based on the one or more states associated with the plurality of antennas.

According to the apparatus and method of various embodiments, by selectively activating antennas based on states associated with the antennas, it is possible to reduce unnecessary power consumption and increase communication efficiency.

Effects which can be acquired by the disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
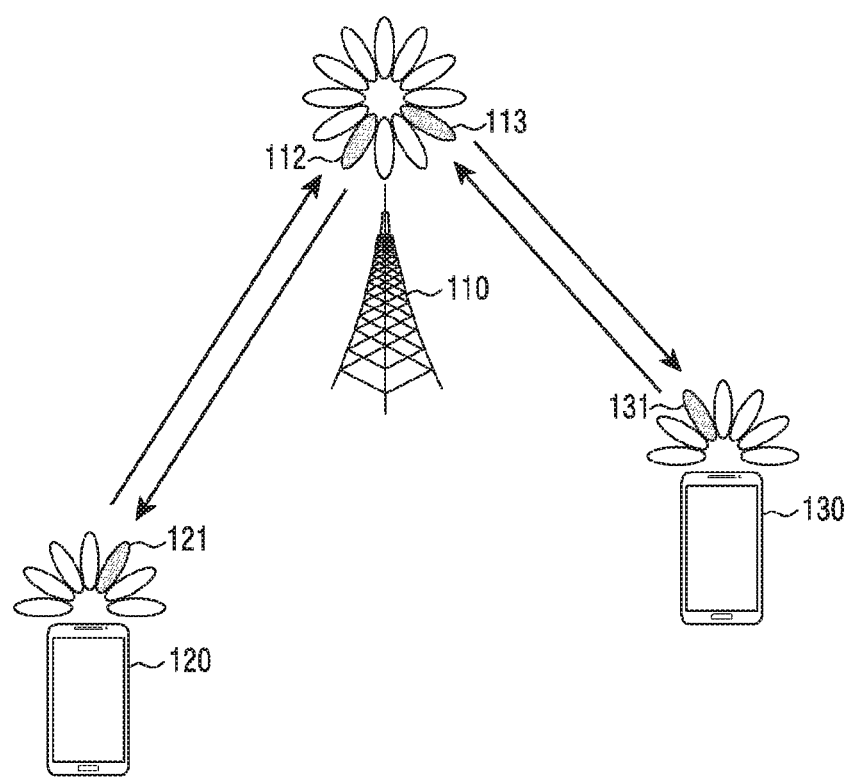
FIG. 1 shows a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to an apparatus and method for controlling antennas in a wireless communication system. In detail, the disclosure provides a technology for selectively activating at least some of antenna arrays in a wireless communication system.

In the following description, terms indicating signals, terms indicating channels, terms indicating control information, terms indicating states of an apparatus, terms indicating the kinds of sensors, terms indicating network entities, terms indicating components of an apparatus, etc. are exemplified for the convenience of description. Accordingly, the disclosure is not limited to the terms to be described hereafter and other terms having equivalent meanings may be used.

Although various embodiments are described using terms that are used in some communication standards in the disclosure, they are only examples for description. Various embodiments may be easily modified to be applied to other communication systems.

FIG. 1 shows a wireless communication system according to an embodiment of the disclosure. FIG. 1 exemplifies a base station 110, a terminal 120, and a terminal 130, as some of nodes that use wireless channels in a wireless communication system. Although FIG. 1 shows only one base station, other base stations that are the same as or similar to the base station 110 may be further included.

The base station 110 is a network infrastructure that provides wireless connection to the terminals 120 and 130. The base station 110 has a coverage that is defined as a predetermined geometric area based on a distance up to which it can transmit signals. The base station 110 may be referred to, other than the term 'base station', as an access point (AP), an eNodeB (eNB), a 5G node (5th generation node), a wireless point, a transmission/reception point (TRP), or other terms having equivalent technical meanings as these terms.

The terminal 120 and the terminal 130, which are devices that are used by users, perform communication with the base station 110 through a wireless channel. If necessary, at least one of the terminal 120 and the terminal 130 may be operated without participation of a user. That is, at least one of the terminal 120 and the terminal 130 may not be carried by a user, as a device that performs machine type communication (MTC). The terminal 120 and the terminal 130 may be referred to, other than the term 'terminal', as user equipment (UE), a mobile station, a subscriber station, a remote terminal, a wireless terminal, or a user device, or other terms having equivalent technical meanings as these terms.

The base station 110, the terminal 120, and the terminal 130 can transmit and receive wireless signals at millimeter wave (mmWave) bands (for example, 28 GHz, 30 GHz, 38 GHz, and 60 GHz). The base station 110, the terminal 120, and the terminal 130 can perform beamforming to improve channel gains. Beamforming may include transmission beamforming and reception beamforming. That is, the base station 110, the terminal 120, and the terminal 130 can give directivity to transmission signals or reception signals. To this end, the base station 110 and the terminals 120 and 130 can select serving beams 112, 113, 121, and 131 through a beam search or beam management procedure. After the serving beams 112, 113, 121, and 131 are selected, communication can be performed by resources having a quasi co-located (QCL) relationship with the resources that have transmitted the serving beams 112, 113, 121, and 131.

If large-scale characteristics of a channel through which symbols on a first antenna port can be inferred from a channel through which symbols on a second antenna port, the first antenna port and the second antenna port can be estimated as having a QCL relationship. For example, the large-scale characteristics may include at least one of delayed spread, Doppler spread, Doppler shift, an average gain, average delay, and a spatial receiver parameter.

Figure 2:
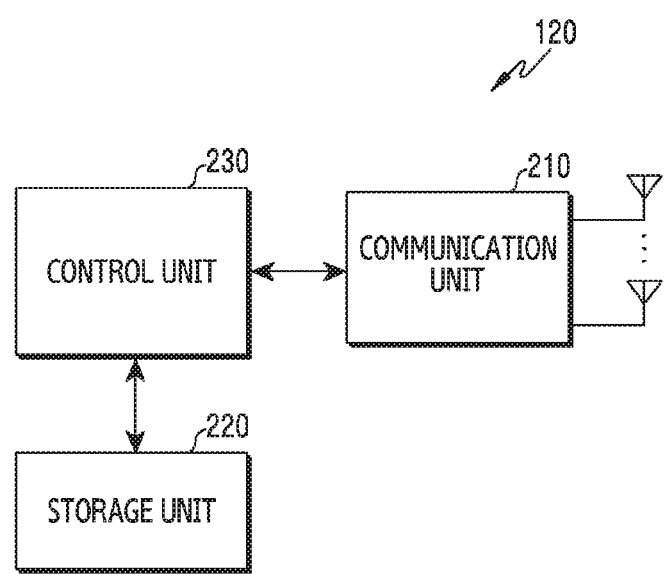
FIG. 2 shows the configuration of a terminal in a wireless communication system according to an embodiment of the disclosure.

FIG. 2 shows the configuration of a terminal in a wireless communication system according to an embodiment of the disclosure. The configuration exemplified in FIG. 2 may be understood as the configuration of the terminal 120. Terms '. . . unit', '. . . er' used hereafter mean the unit for processing at least one function or operation and may be implemented by hardware, software, or a combination of hardware and software.

Referring to FIG. 2, a terminal may include a communication unit 210 (e.g., a transceiver), a storage unit 220 (e.g., a memory), and a control unit 230 (e.g., at least one processor).

The communication unit 210 performs functions for transmitting/receiving signals through a wireless channel. For example, the communication unit 210 performs a conversion function among baseband signals and bitstreams in accordance with the physical layer specification of the system. For example, the communication unit 210 generates complex symbols by encoding and modulating transmission bitstreams when transmitting data. The communication unit 210 restores received bitstreams by demodulating and decoding baseband signals when receiving data. Further, the communication unit 210 up-converts baseband signals into radio frequency (RF) band signals and then transmits the converted signals through an antenna, and down-converts RF band signals received through the antenna into baseband signals. For example, the communication unit 210 may include a transmission filter, a reception filter, an amplifier, a mixer, an oscillator, a digital-to-analog converter (DAC), an analog-to-digital converter (ADC), etc.

The communication unit 210 may include a plurality of transmission/reception paths. According to an embodiment, the communication unit 210 may include a plurality of antennas installed at different positions. Each of the antennas may be an array antenna including a plurality of antenna elements. The communication unit 210 can perform beamforming using a plurality of RF chains connected to the antennas, respectively. In terms of hardware, the communication unit 210 may be composed of a digital circuit and an analog circuit (for example, a radio frequency integrated circuit (RFIC)). The digital circuit and the analog circuit may be implemented in one package.

The communication unit 210 transmits and receives signals, as described above. The communication unit 210 may be entirely or partially referred to as a 'transmitter', a 'receiver', or a 'transceiver'. Transmission and reception that are performed through wireless channels are used as meanings that include the above-mentioned processing performed by the communication unit 210.

The storage unit 220 keeps data such as fundamental programs, applications, and setting information for operation of the terminal. The storage unit 220 may be a volatile memory, a nonvolatile memory, or a combination of a volatile memory and a nonvolatile memory. The storage unit 220 provides the kept data in response to a request from the control unit 230.

The control unit 230 controls the general operations of the terminal. For example, the control unit 230 transmits and receives signals through the communication unit 210. The control unit 230 records and reads data on and from the storage unit 220. The control unit 230 can perform the functions of a protocol stack required by communication standards. To this end, the control unit 230 may include at least one processor or microprocessor, or may be a part of a processor. A portion of the communication unit 210 and the control unit 230 may be referred to as a communication processor (CP). According to various embodiments, the control unit 230 can perform an operation for selectively activating a plurality of antennas. For example, the control unit 230 can control a terminal to perform operations according to various embodiments to be described below.

Figure 3A:
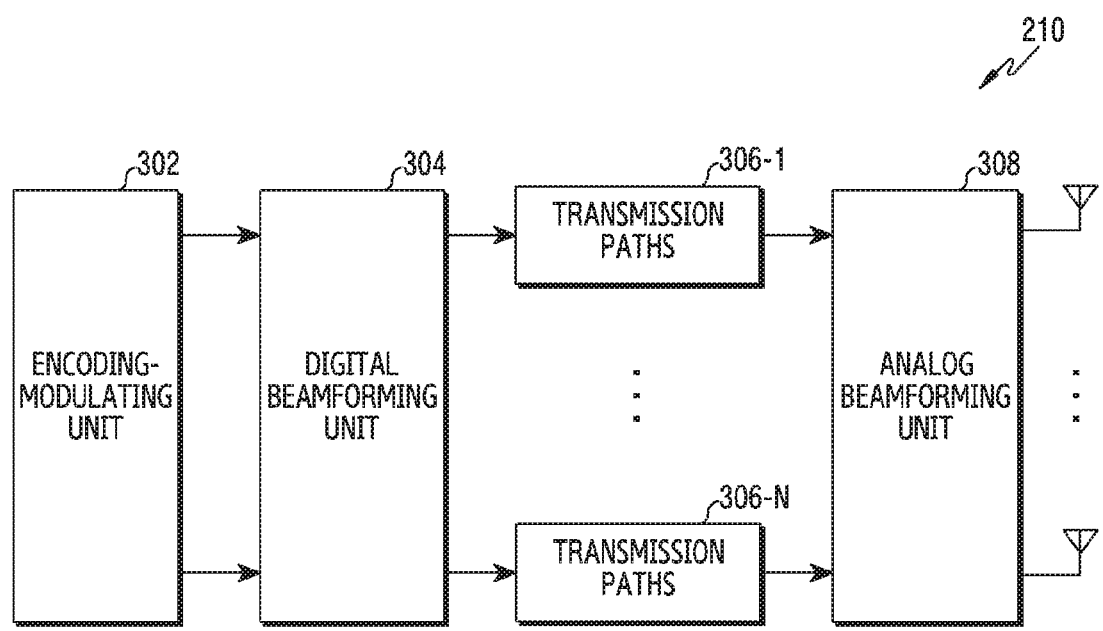
FIGS. 3A, 3B and 3C show the configuration of a communication unit in a wireless communication system according to various embodiments of the disclosure.
Figure 3B:
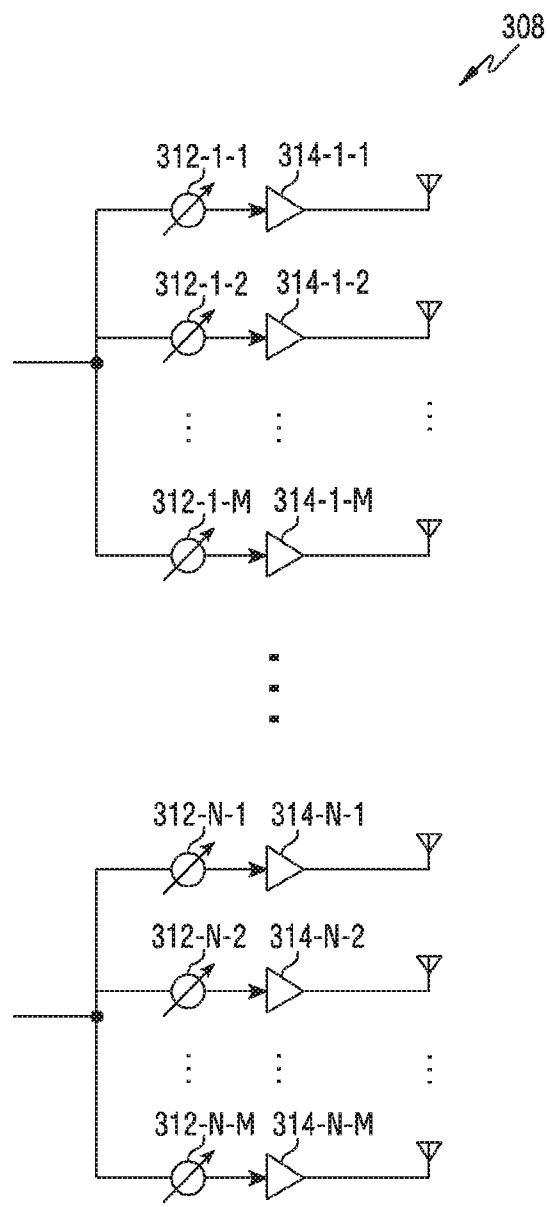
Figure 3C:
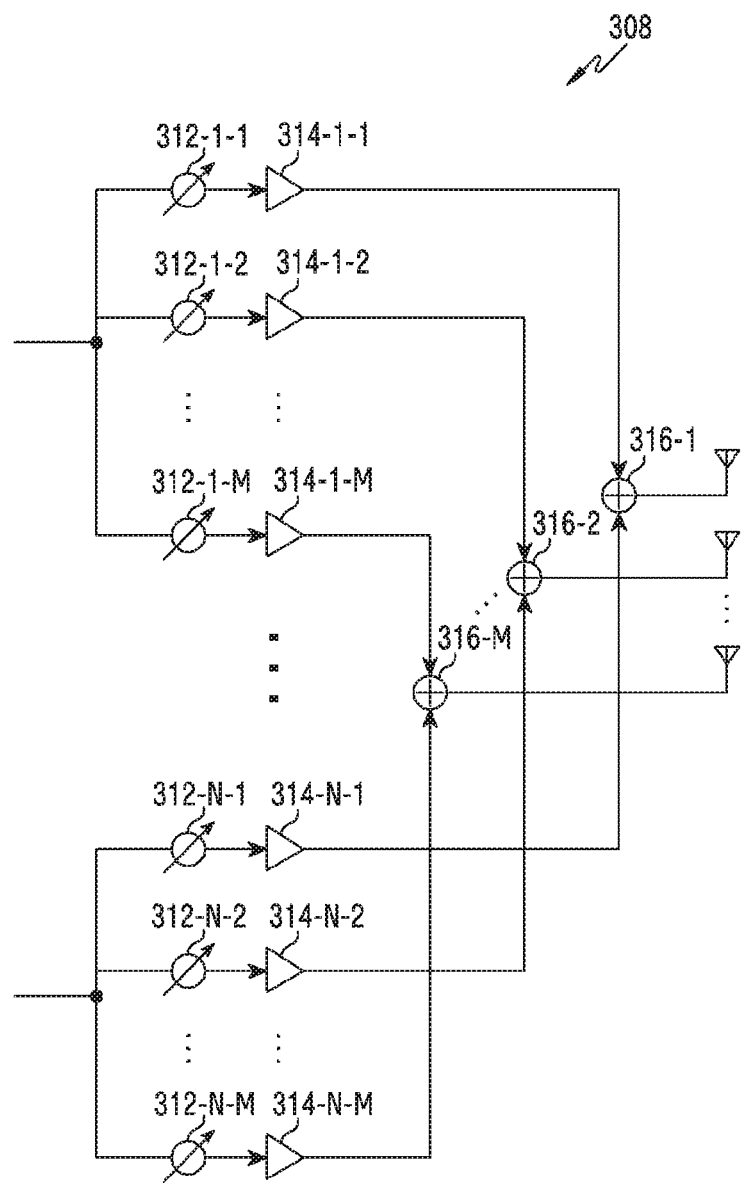

FIGS. 3A to 3C show the configuration of a communication unit in a wireless communication system according to various embodiments of the disclosure. FIGS. 3A to 3C show an example of the detailed configuration of the communication unit 210 of FIG. 2. In detail, FIGS. 3A to 3C show components for performing beamforming as parts of the communication unit 210 of FIG. 2.

Referring to FIG. 3A, the communication unit 210 includes encoding-modulating unit 302, a digital beamforming unit 304, a plurality of transmission paths 306-1 to 306-N, and an analog beamforming unit 308.

The encoding-modulating unit 302 performs channel encoding. For channel encoding, at least one of a low density parity check (LDPC) code, a convolution code, and a polar code. The encoding-modulating unit 302 generates modulation symbols by performing constellation mapping.

The digital beamforming unit 304 performs beamforming on digital symbols (e.g., modulation symbols). To this end, the digital beamforming unit 304 multiplies modulation symbols by beamforming weights. The beamforming weights are used to change the magnitudes and phases of signals and may be referred to as a 'precoding matrix', a 'precoder', etc. The digital beamforming unit 304 outputs digital-beamformed modulation symbols to the transmission paths 306-1 to 306-N. The modulation symbols may be multiplexed or same modulation symbols may be provided to the transmission paths 306-1 to 306-N in accordance with multiple input multiple output (MIMO).

The transmission paths 306-1 to 306-N convert the digital-beamformed digital signals into analog signals. To this end, the transmission paths 306-1 to 306-N each may include an inverse fast fourier transform (IFFT) calculation unit, a cyclic prefix (CP) inserting unit, a DAC, and an up-converting unit. The CP inserting unit is provided for orthogonal frequency division multiplexing (OFDM) and may not be provided when other physical layer methods (e.g., filter bank multi-carrier (FBMC)) are applied. That is, the transmission paths 306-1 to 306-N provide independent signal processing processes for a plurality of streams generated by digital beamforming. However, depending on the implementing method, some of the components of the transmission paths 306-1 to 306-N may be shared.

The analog beamforming unit 308 performs beamforming on analog signals. To this end, the digital beamforming unit 304 multiplies analog signals by beamforming weights. The beamforming weights are used to change the magnitudes and phases of signals. In detail, the analog beamforming unit 308 may be configured as shown in FIG. 3B or FIG. 3C, depending on the connection structure of the transmission paths 306-1 to 306-N and antennas.

Referring to FIG. 3B, signals input to the analog beamforming unit 308 are transmitted through antennas after processes of phase/magnitude conversion and amplification. Signals on the paths are transmitted through different antenna sets, that is, antenna arrays. As for processing of a signal input through the first path, the signal is converted into signal streams having different or same phases/magnitudes by phase/magnitude converters 312-1-1 to 312-1-M, is amplified by amplifiers 314-1-1 to 314-1-M, and is then transmitted through antennas.

Referring to FIG. 3C, signals input to the analog beamforming unit 308 are transmitted through antennas after processes of phase/magnitude conversion and amplification. Signals on the paths are transmitted through same antenna sets, that is, antenna arrays. As for processing of a signal input through the first path, the signal is converted into signal streams having different or same phases/magnitudes by phase/magnitude converters 312-1-1 to 312-1-M and is amplified by amplifiers 314-1-1 to 314-1-M. In order to be transmitted through one antenna array, the amplified signals are summed by summation units 316-1-1 to 316-1-M based on antenna elements and then transmitted through antennas.

FIG. 3B shows an example in which independent antenna arrays for transmission paths are used and FIG. 3C shows an example in which transmission paths share one antenna array. However, according to another embodiment, some transmission paths may use independent antenna arrays and the other transmission paths may share one antenna array. Further, according to another embodiment, a structure that can be adoptively changed in accordance with situations may be used by applying a switchable structure between transmission paths and antenna arrays.

The structure described with reference to FIGS. 3A to 3C can be understood as a configuration for one antenna array. According to an embodiment, a terminal (e.g., the terminal 120) may include a plurality of antenna arrays. In this case, at least one of the components shown in FIGS. 3A to 3C may exist as many as the number of a plurality of antenna arrays. For example, when N antenna arrays are provided, N analog beamforming units may be provided.

A terminal can perform beamforming using the structure described with reference to FIGS. 3A to 3C. A transmission signal has a high gain in a specific direction by beamforming. An example of a change in directivity according to beamforming is described with reference to FIG. 4.

Figure 4:
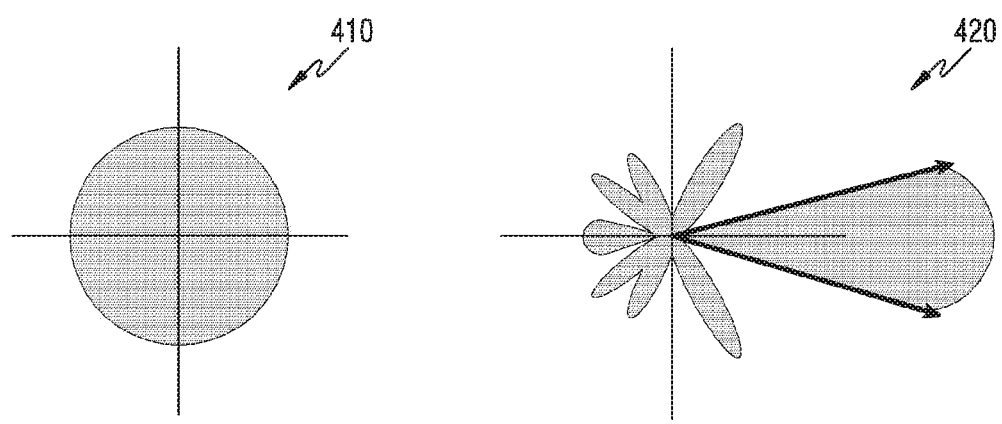
FIG. 4 shows an example of a radiation pattern of a signal by beamforming in a wireless communication system according to an embodiment of the disclosure.

FIG. 4 shows an example of a radiation pattern of a signal by beamforming in a wireless communication system according to an embodiment of the disclosure. Referring to FIG. 4, a pattern 410 exemplifies a radiation pattern when beamforming is not performed, that is, a radiation pattern of an omni-directional beam and a pattern 420 exemplifies a radiation pattern when beamforming is performed, that is, a radiation pattern of a directional beam. Referring to the pattern 410, relatively constant gains are shown in all directions when beamforming is not performed. Referring to the pattern 420, it can be seen that when beamforming is performed, relatively large gains are shown in specific direction, gains in other directions are reduced.

As shown in FIG. 4, when beamforming is performed, a signal has high gains in specific directions. This characteristic of beamforming can be used as an alternative plan that can overcome a paths loss. An antenna array is generally used to perform beamforming. Accordingly, at least one antenna array is installed at a specific position on a terminal. For example, an antenna array may be implemented as a patch antenna.

The terminal may include other components (e.g., a substrate, a display, and a housing) other than the antenna, and accordingly, at least any one side or direction of the antenna may be blocked by other components. Accordingly, when signals are transmitted through the antenna, radiation in specific directions may be restricted, depending on the directions of an instrument and a circuit board. Accordingly, the range of a direction in which one antenna can effectively transmit/receive signals may be limited. Antennas suitable for transmitting/receiving signals may depend on grip of a user and rotation and movement of a terminal. Therefore, a plurality of antennas may be installed at two or more positions to secure a wide signal transmission/reception range. For example, antennas may be installed, as show in FIG. 5.

Figure 5:
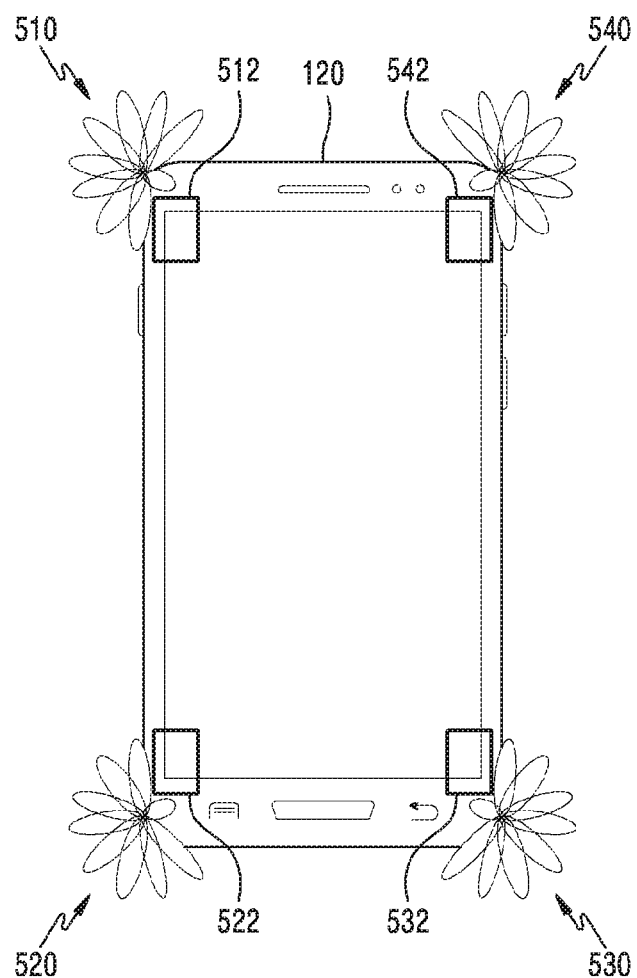
FIG. 5 shows an example of installing a plurality of antennas in a wireless communication system according to an embodiment of the disclosure.

FIG. 5 shows an example of installing a plurality of antennas in a wireless communication system according to an embodiment of the disclosure. Referring to FIG. 5, a terminal 120 includes four antennas 512, 522, 532, and 542. Each of the four antennas 512, 522, 532, and 542 may include a plurality of antenna elements. A first antenna 512 is arranged adjacent to the left upper end (or corner) 510 of the terminal, a second antenna 522 is arranged adjacent to the left lower end (or corner) 520 of the terminal, a third antenna 532 is arranged adjacent to the right lower end (or corner) 530 of the terminal, and a fourth antenna 542 is arranged adjacent to the right upper end (or corner) 540 of the terminal.

Accordingly, when signals are transmitted through the antennas 512, 522, 532, and 542, radiation in specific directions may be restricted, depending on the directions of an instrument and a circuit board. For example, as for the first antenna 512, the upper and the left side of the terminal 120 are relatively open, but the lower end and the right side are relatively blocked by other components such as a substrate. Accordingly, the other antennas (e.g., the second antenna 522, the third antenna 532, and the fourth antenna 542) can be used to complement signal transmission/reception in the directions that are not covered by the first antenna 512.

As described with reference to FIG. 5, the terminal 120 may include four antennas. However, FIG. 5 is an example and the structure of FIG. 5 does not limit the disclosure. For example, the terminal 120 may include three or less or five or more antennas, some of the antennas may be composed of a single antenna element, and at least one antenna may be installed at a position other than four corners.

As shown in FIG. 5, a plurality of antennas may be installed in a terminal. When all the installed antennas are activated, a great amount of power may be consumed. Activation is to enable corresponding antennas to transmit/receive signals and it means transition of components (e.g., an amplifier) processing at least one signal and connected to the antennas into a state in which they can normally operate. Accordingly, in order to reduce a power consumption amount, it may be considered to activate only some antennas, that is, deactivate the other antennas. Deactivation is to make corresponding antennal not transmit/receive signals and it means transition of components (e.g., an amplifier) processing at least one signal and connected to the antennas into a state in which they cannot normally operate (e.g., an off state, a power-cut state, a low-power state, a stand-by state, and a sleep state). Accordingly, the disclosure provides various embodiments for selectively activating antennas.

Figure 6:
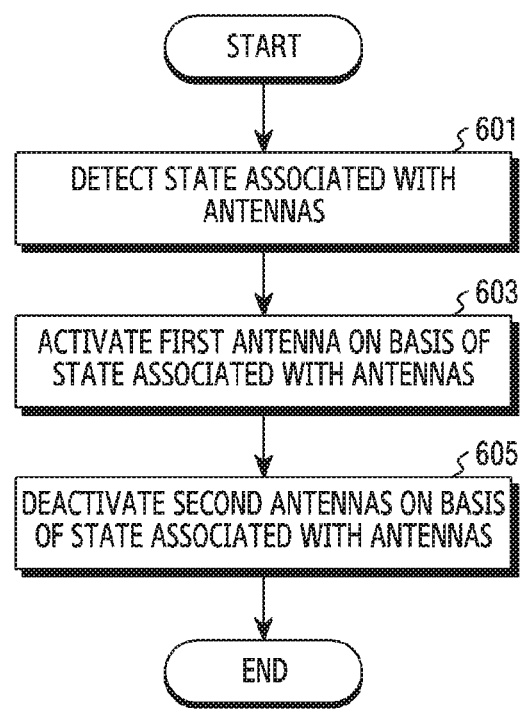
FIG. 6 is a flowchart illustrating control of antennas of a terminal in a wireless communication system according to an embodiment of the disclosure.

FIG. 6 is a flowchart illustrating control of antennas of a terminal in a wireless communication system according to an embodiment of the disclosure. FIG. 6 exemplifies an operation method of the terminal 120.

Referring to FIG. 6, in operation 601, a terminal detects state associated with antennas. The state associated with antennas may be defined in various ways in accordance with detailed embodiments. For example, the state associated with antennas may be determined based on signals transmitted/received through a currently activated antenna and at least one of sensors in the terminal.

In operation 603, the terminal activates a first antenna, depending on the state associated with antennas. That is, the terminal can activate the first antenna additionally or instead of the currently activate antenna. Accordingly, the first antenna or a plurality of antennas including the first antenna can be activated.

In operation 605, the terminal deactivates a second antenna, depending on the state associated with antennas. That is, the terminal can activate the second antenna additionally or instead of the currently deactivate antenna. Accordingly, the second antenna or a plurality of antennas including the second antenna can be deactivated.

As described with reference to FIG. 6, the operation states (e.g., activation and deactivation) of antennas can be controlled based on the states associated with the antennas. Accordingly, an activated antenna and a deactivated antenna can be switched and this operation may be referred to as 'antenna switching' in the following description. The states associated with antennas can be determined in various ways, and according to an embodiment, may include whether the positions where the antennas are installed are gripped by a user. Embodiments according to whether the positions are gripped will be described hereafter with reference to FIGS. 7 to 9B.

Figure 7:
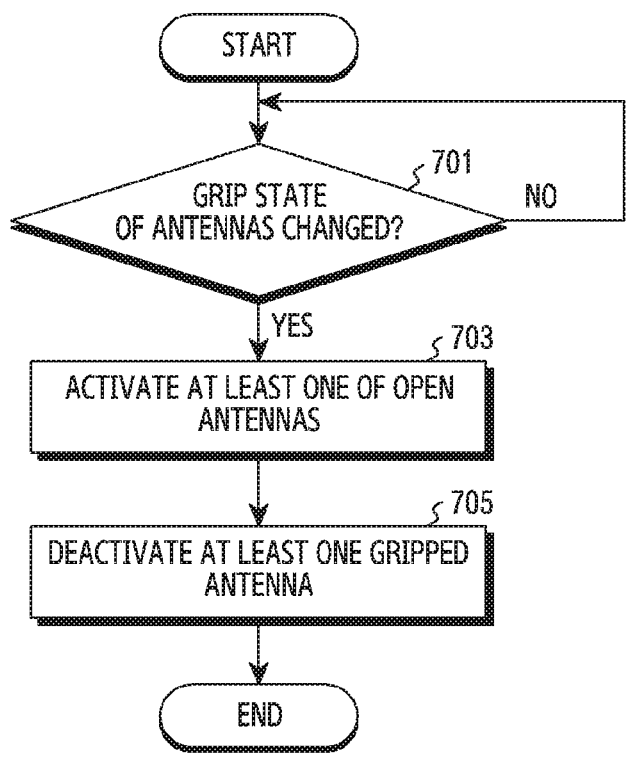
FIG. 7 is a flowchart illustrating control of antennas of a terminal based on grip states in a wireless communication system according to an embodiment of the disclosure.

FIG. 7 is a flowchart illustrating control of antennas of a terminal based on a grip state in a wireless communication system according to an embodiment of the disclosure. FIG. 7 exemplifies an operation method of the terminal 120.

Referring to FIG. 7, in operation 701, a terminal determines whether the grip state of antennas is changed. The grip state means whether the positions where the antennas are installed are covered by another object (e.g., a user's hand).

The grip state can be changed, depending on whether a user uses the terminal, and the terminal can detect a change of the grip state through sensors.

When the grip state is changed, in operation 703, the terminal activates at least one of open antennas. That is, the terminal activates at least one antenna not covered by another object. For example, the terminal selects at least one antenna to use for communication based on sensor data and activates the selected at least one antenna.

In operation 705, the terminal activates at least one of gripped antennas. That is, the terminal deactivates at least one antenna covered by another object. For example, the terminal selects at least one antenna not to use for communication based on sensor data and deactivates the selected at least one antenna.

As shown in FIG. 7, antennas can be controlled based on the grip state. To this end, the terminal may include sensors for detecting a grip state. An example of a terminal including sensors is described with reference to FIG. 8.

Figure 8:
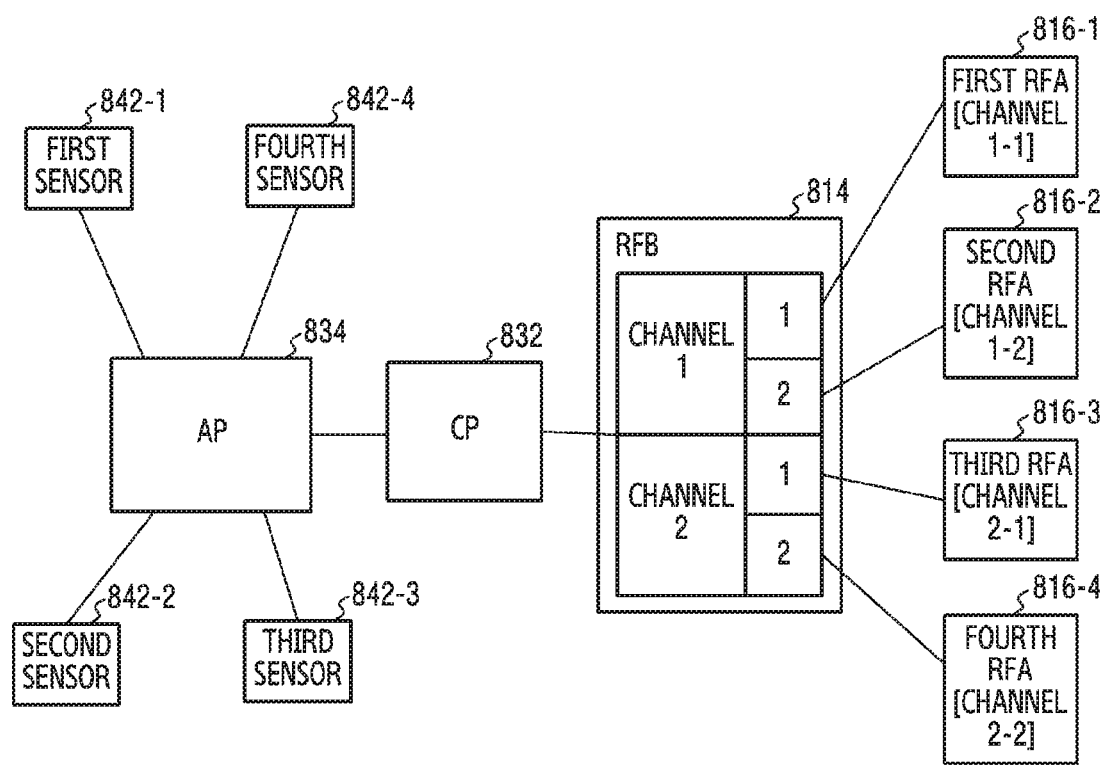
FIG. 8 shows the configuration of a terminal including sensors in a wireless communication system according to an embodiment of the disclosure.

FIG. 8 shows the configuration of a terminal including sensors in a wireless communication system according to an embodiment of the disclosure. The configuration exemplified in FIG. 8 may be understood as the configuration of the terminal 120. Referring to FIG. 8, a terminal includes an RFB (RF-B) 814, a plurality of RFAs (RF-A) 816-1 to 816-4, a CP 832, an application processor (AP) 834, and a plurality of sensors 842-1 to 842-4.

The RFB 814 processes RF signals. The RFB 814 can perform common processing on signals that are transmitted/received through all antennas. For example, the RFB 814 can perform functions of gain control, processing of intermediate frequency signals, frequency up-conversion, and frequency down-conversion. Signals for antennas can be logically or physically separately processed. To this end, the RFB 814 may have a logical or physical structure divided into a plurality of channels (e.g., a channel 1 and a channel 2) and further into sub-channels (e.g., a channel 1-1, a channel 1-2, a channel 2-1, and a channel 2-2).

The RFAs 816-1 to 816-4 process RF signals. The RFAs 816-1 to 816-4 can process signals that are transmitted/received through respectively corresponding antennas. For example, a first RFA 816-1 can process signals that are transmitted/received through a first antenna. Accordingly, the RFAs 816-1 to 816-4 may be arranged adjacent to the respectively corresponding antennas. For example, the RFAs 816-1 to 816-4 can perform functions such as phase shifting, amplifying, switching, and multiplexing.

The CP 832 is a processor that performs and controls functions related to communication. The CP 832 can process baseband signals and can control the operations of the RFB 814 and the RFAs 816-1 to 816-4. The AP 834 is a processor that performs and controls various functions except for communication of the terminal. For example, the AP 834 can control a sensing operation of the terminal and process sensor data. For example, the AP 834 can determine an antenna-related state based on sensor data provided from a plurality of sensors 842-1 to 842-4.

The sensors 842-1 to 842-4 generate sensor data for determining a grip state. For example, the sensors 842-1 to 842-4 may be at least one of grip sensors, proximity sensors, and thermal sensors. For example, a first sensor 842-1 may include a capacitor and can generate sensor data based on a charging/discharging phenomenon according to grip.

In the structure described with reference to FIG. 8, it was described that some of processing on RF signals is performed by the RFB 814 and the other is performed by the RFAs 816-1 to 816-4. However, this is only an example and the disclosure is not limited thereto. According to another embodiment, all RF signals may be processed by the RFB 814 except for the RFAs 816-1 to 816-4. According to another embodiment, all RF signals may be processed by the RFAs 816-1 to 816-4 except for the RFB 814.

According to the embodiment described with reference to FIGS. 7 and 8, the operation states (e.g., activation and deactivation) of the antennas can be controlled based on the position of the grip of user's hands. A detailed example of controlling antennas in accordance with grip positions based on the structure of FIG. 5 is described with reference to FIG. 9A.

Figure 9A:
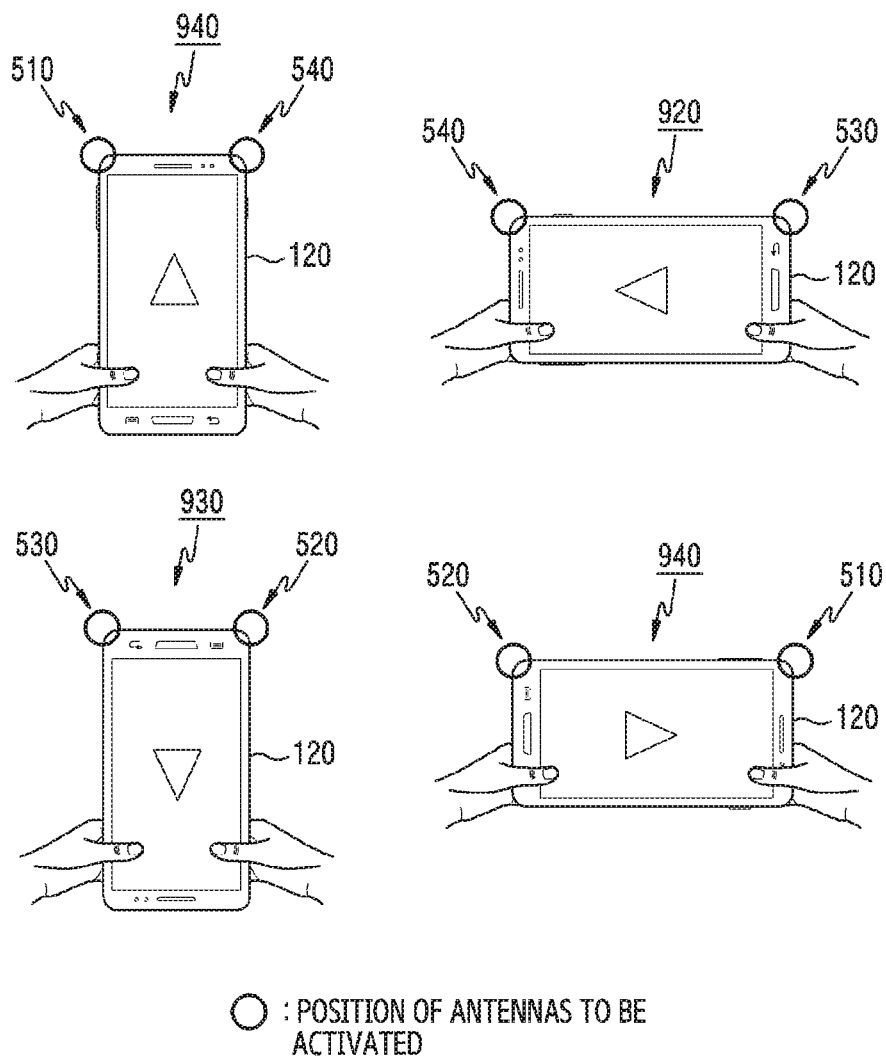
FIG. 9A shows an example of antennas that are activated based on grip positions in a wireless communication system according to an embodiment of the disclosure.

FIG. 9A shows an example of antennas that are activated based on grip positions in a wireless communication system according to an embodiment of the disclosure.

Referring to FIG. 9A, in state 910, the left lower end and the right lower end of the terminal 120 are gripped and the antennas at the left upper end 510 and the right upper end 540 are activated. In state 920, the left upper end and the left lower end of the terminal 120 are gripped and the antennas at the right lower end 530 and the right upper end 540 are activated. In state 930, the right upper end and the left upper end of the terminal 120 are gripped and the antennas at the left lower end 520 and the right lower end 530 are activated. In state 940, the right lower end and the right upper end of the terminal 120 are gripped and the antennas at the left upper end 510 and the left lower end 520 are activated.

Figure 9B:
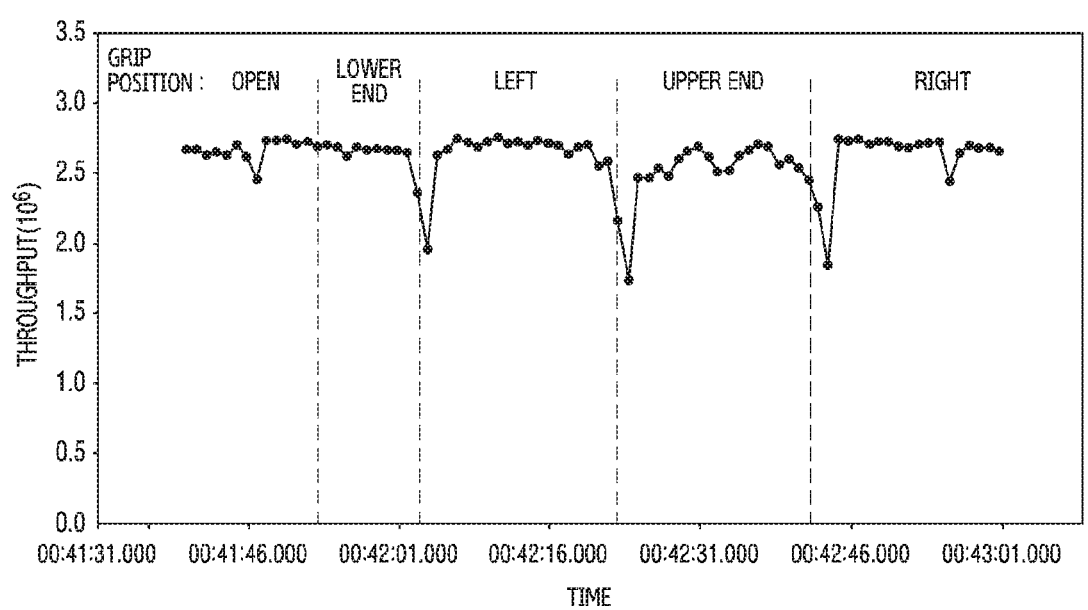
FIG. 9B shows an example of a change of throughput when antennas are controlled based on grip positions in a wireless communication system according to an embodiment of the disclosure.

An example of a change of throughput according to sequential changes of the four states 910, 920, 930, and 940 exemplified in FIG. 9A and corresponding control of antennas is shown in FIG. 9B.

FIG. 9B shows an example of a change of throughput when antennas are controlled based on grip positions in a wireless communication system according to an embodiment of the disclosure. Referring to FIG. 9B, the throughput is about $2.7 \times 10^6$ in an open state in which all antennas are not gripped. When the lower end of the terminal is gripped in this state, the terminal senses the state 910 and activates the antennas at the left upper end 510 and the right upper end 540. Thereafter, the grip position is changed to the left, the activated antenna at the left upper end 510 is blocked, and accordingly, the throughput temporarily decreases. The terminal that has sensed the change of the grip position deactivates the antenna at the left upper end 510 and activates the right lower end 530. Accordingly, the throughput is recovered. When the grip position is changed to the upper end, the throughput temporarily decreases and the terminal deactivates the antenna at the right upper end 540 and activates the antenna at the left lower end 520. Similarly, when the grip position is changed to the right, the throughput temporarily decreases and the terminal deactivates the antenna at the left lower end 520 and activates the antenna at the left upper end 510. Accordingly, the throughput can be recovered.

As described above, the antennas can be controlled based on grip states. According to another embodiment, antennas may be controlled based on other sensor data. For example, antennas can be controlled based on sensor data generated by an acceleration sensor or a gyro sensor. Control that uses an acceleration sensor or a gyro sensor can be understood as control based on changes in movement/posture of a terminal or relative position relationship of antennas. An embodiment that controls antennas based on changes in relative position relationship of the antennas is described with reference to FIGS. 10 and 11.

Figure 10:
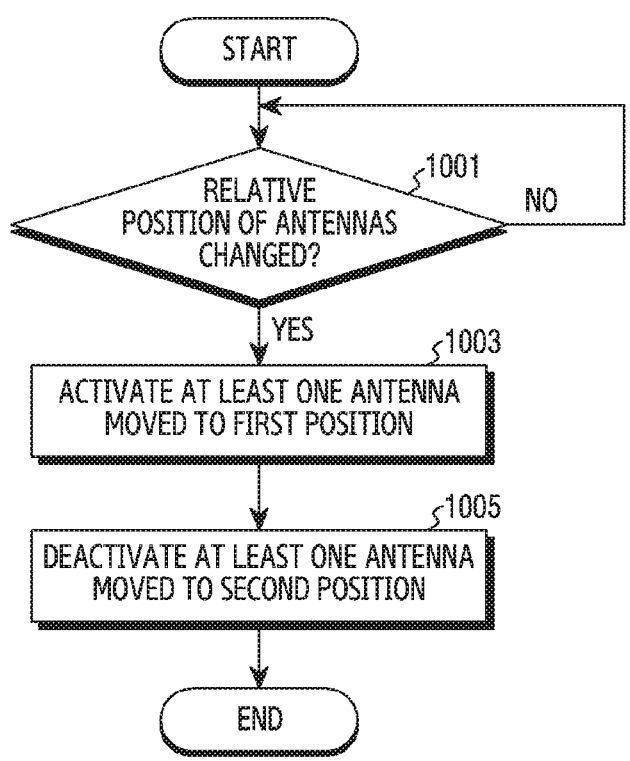
FIG. 10 is a flowchart illustrating control of antennas of a terminal based on relative positions of the antennas in a wireless communication system according to an embodiment of the disclosure.

FIG. 10 is a flowchart illustrating control of antennas of a terminal based on relative positions of the antennas in a wireless communication system according to an embodiment of the disclosure. FIG. 10 exemplifies an operation method of the terminal 120.

Referring to FIG. 10, in operation 1001, a terminal determines whether relative positions of antennas are changed. The relative position means the position (e.g., a left, a right, an upper end, and a lower end) of a corresponding antenna relative to the positions of other antennas. The relative positions of the antennas may be changed by rotation and movement of the terminal.

In operation 1003, the terminal activates at least one antenna that has been moved to a first position. The first position is a position that is expected to be advantageous in activation for communication and may be defined in advance. For example, the first position may be defined as an upper end. That is, at least one antenna arranged at the upper end with respect to another antenna can be activated.

In operation 1005, the terminal activates at least one antenna that has been moved to a second position. The second position is a position that is expected to be disadvantageous in activation for communication and may be defined in advance. For example, the second position may be defined as a lower end.

In the embodiment described with reference to FIG. 10, the terminal determines that the relative positions of the antennas are changed. According to an embodiment, a terminal can determine rotation and movement of the terminal based on sensor data that are provided from an acceleration sensor or a gyro sensor and can determine changes in relative position of the antennas due to the rotation and movement. According to another embodiment, a terminal can determine changes in relative position of antennas based on rotation of an image. In general, a terminal includes a display for displaying images and the images are set to rotate in the opposite direction to rotation of the terminal for the convenience for a user. That is, rotation of an image means rotation of the terminal, so the terminal can determine changes in relative positions of antennas based on rotation of the image. In detail, a terminal can determine changes in relative position of antennas based on setting data for rotation of images etc.

According to the embodiment described with reference to FIG. 10, the operation states (e.g., activation and deactivation) of the antennas can be controlled based on relative positions of the antennas. A detailed example of controlling antennas in accordance with relative positions based on the structure of FIG. 5 is described with reference to FIG. 11.

Figure 11:
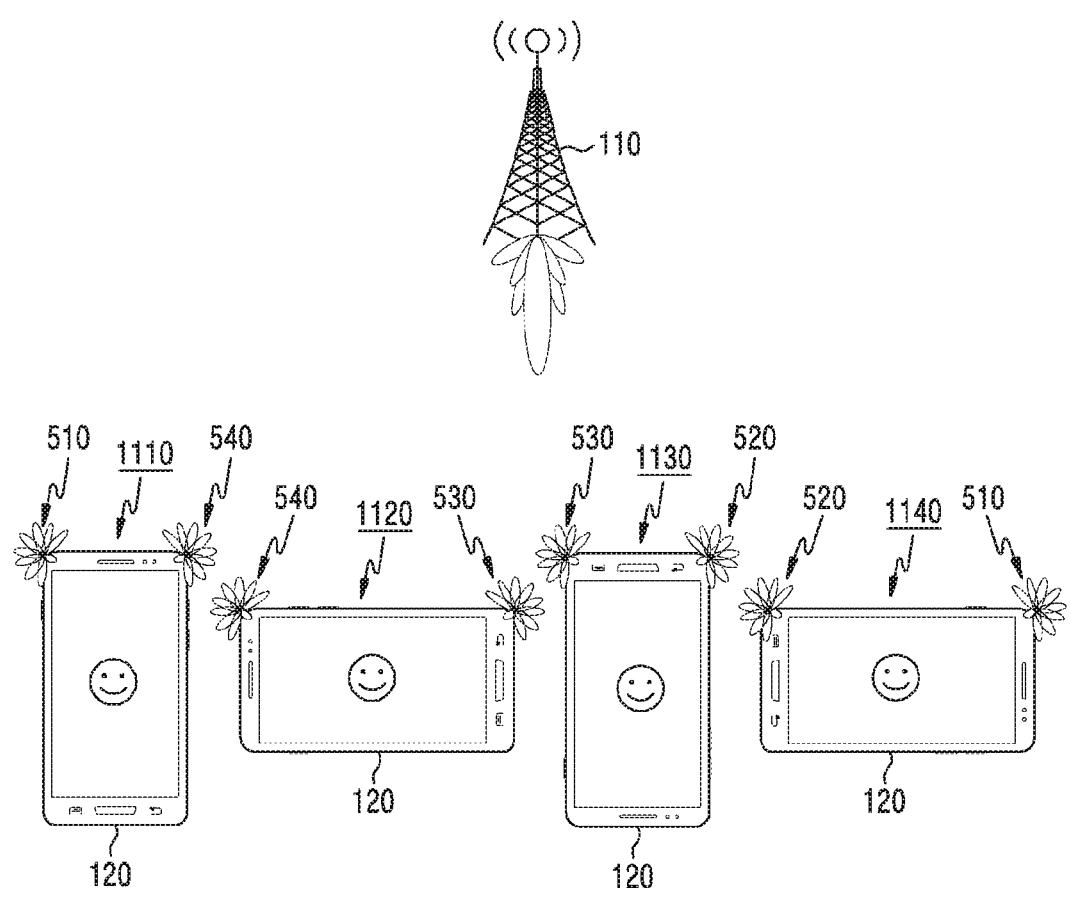
FIG. 11 shows an example of antennas that are activated based on relative positions in a wireless communication system according to an embodiment of the disclosure.

FIG. 11 shows an example of antennas that are activated based on relative positions in a wireless communication system according to an embodiment of the disclosure. In the example of FIG. 11, the relative position that is a condition for activation is the upper end and the relative position that is a condition for deactivation is the lower end.

Referring to FIG. 11, in state 1110, the left upper end 510 and the right upper end 540 of the terminal 120 are positioned upward and the antennas at the left upper end 510 and the right upper end 540 are activated. In state 1120, the right lower end 530 and the right upper end 540 of the terminal 120 are positioned upward and the antennas at the right lower end 530 and the right upper end 540 are activated. In state 1130, the left lower end 520 and the right lower end 530 of the terminal 120 are positioned upward and the antennas at the left lower end 520 and the right lower end 530 are activated. In state 1140, the left upper end 510 and the left lower end 520 of the terminal 120 are positioned upward and the antennas at the left upper end 510 and the left lower end 520 are activated. Accordingly, even though portions without the antennas are gripped or are not gripped (e.g., the terminal is mounted on a cradle), antennas to be activated can be appropriately selected.

As described above, the antennas can be controlled based on relative positions. According to another embodiment, antennas may be controlled based on signals that are transmitted/received through the antennas. In a case based on signals, appropriate antennas can be selected even in the environment shown in FIG. 12 to be described hereafter.

Figure 12:
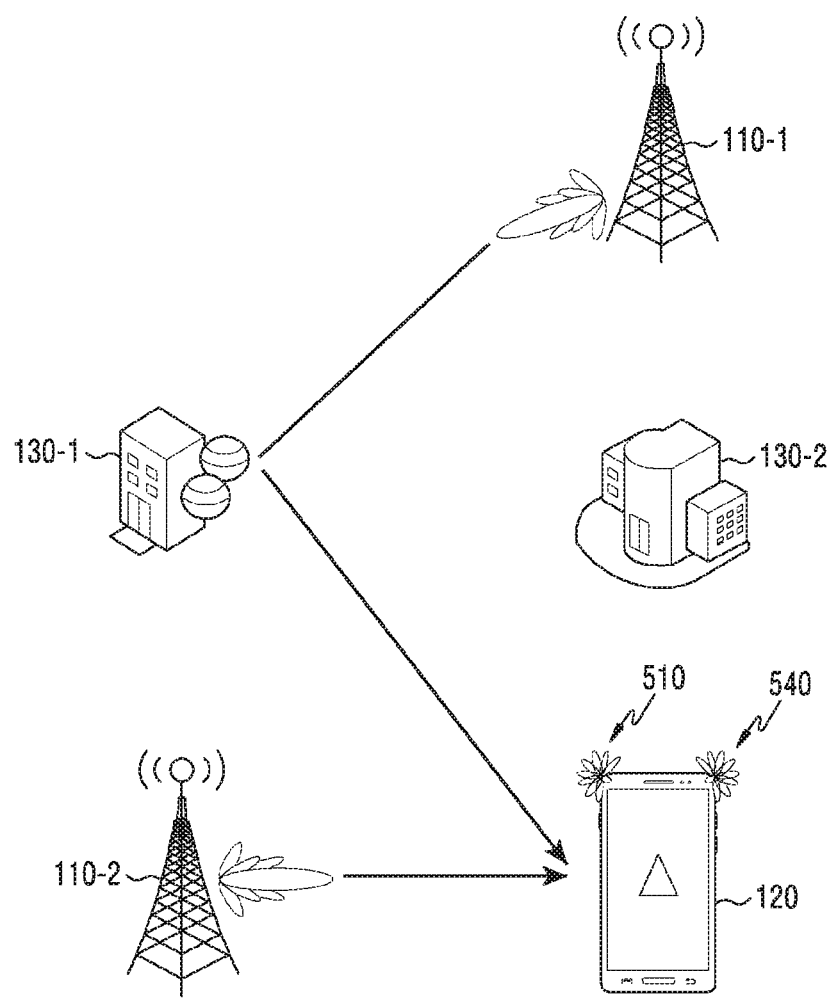
FIG. 12 shows an example of a communication environment of a terminal in a wireless communication system according to an embodiment of the disclosure.

FIG. 12 shows an example of a communication environment of a terminal in a wireless communication system according to an embodiment of the disclosure.

Referring to FIG. 12, when a serving base station of the terminal 120 is a base station 110-1, the serving base station is arranged in the direction that the upper end of the terminal 120 faces. In this case, the antennas at the upper end, that is, the left upper end 510 and the right upper end 540 can be activated. However, the shortest path between the base station 110-1 and the terminal 120 is blocked by an obstacle 130-2 and a signal from the base station 110-1 is reflected by the obstacle 130-1 and then received. Accordingly, signals are received not to the upper end, but from the left side of the terminal 120. When the serving base station of the terminal 120 is a base station 110-2, the serving base station is arranged not to face the upper end, but at the left side of the terminal 120. In this case, signals are received not to the upper end, but from the left side of the terminal 120. Accordingly, it may not always be optimum to define the upper end as a condition for activating antennas. Accordingly, in the disclosure, embodiments that control antennas based on received signals are described hereafter with reference to FIGS. 13 through 20.

Figure 13:
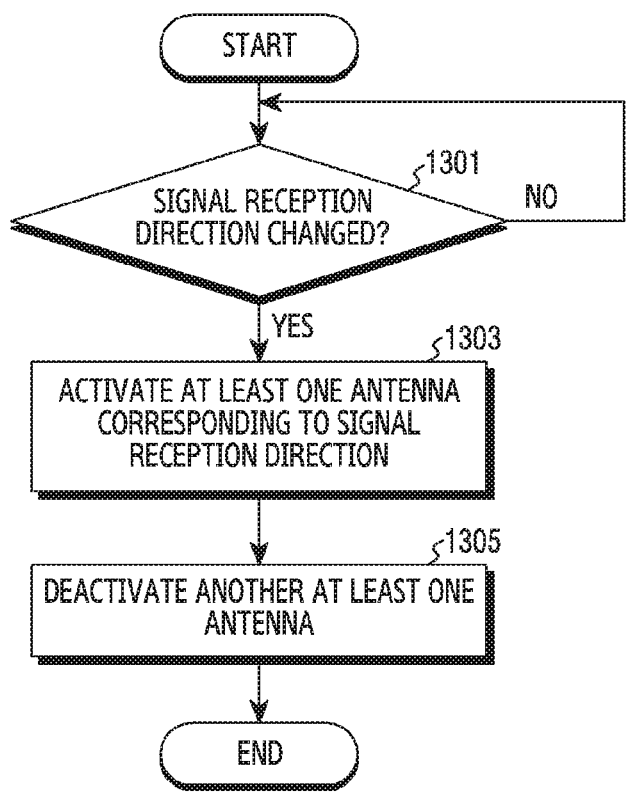
FIG. 13 is a flowchart illustrating control of antennas of a terminal based on reception directions of signals in a wireless communication system according to an embodiment of the disclosure.

FIG. 13 is a flowchart illustrating control of antennas of a terminal based on reception directions of signals in a wireless communication system according to an embodiment of the disclosure. FIG. 13 exemplifies an operation method of the terminal 120.

Referring to FIG. 13, in operation 1301, a terminal determines whether the reception direction of a signal is changed. The reception direction of a signal may be determined based on the result of measuring received beams.

In operation 1303, the terminal activates at least one antenna corresponding to the reception direction of the signal. For example, the terminal can activate at least one antenna positioned in the reception direction of the signal. Accordingly, at least one antenna can be activated additionally or instead of a currently activated antenna.

In operation of 1305, the terminal deactivates another at least one antenna of the signal. For example, the terminal can deactivate at least one antenna not positioned in the reception direction of the signal. Accordingly, at least one antenna can be deactivated additionally or instead of a currently deactivated antenna.

According to the embodiment described with reference to FIG. 13, the operation states (e.g., activation and deactivation) of the antennas can be controlled based on the reception directions of signals. That is, when the reception direction of a signal is determined, an antenna that can provide a more excellent gain/scan range for the signal that is received in the determined direction can be activated. A detailed example of controlling antennas in accordance with relative positions based on the structure of FIG. 5 is described with reference to FIG. 14.

Figure 14:
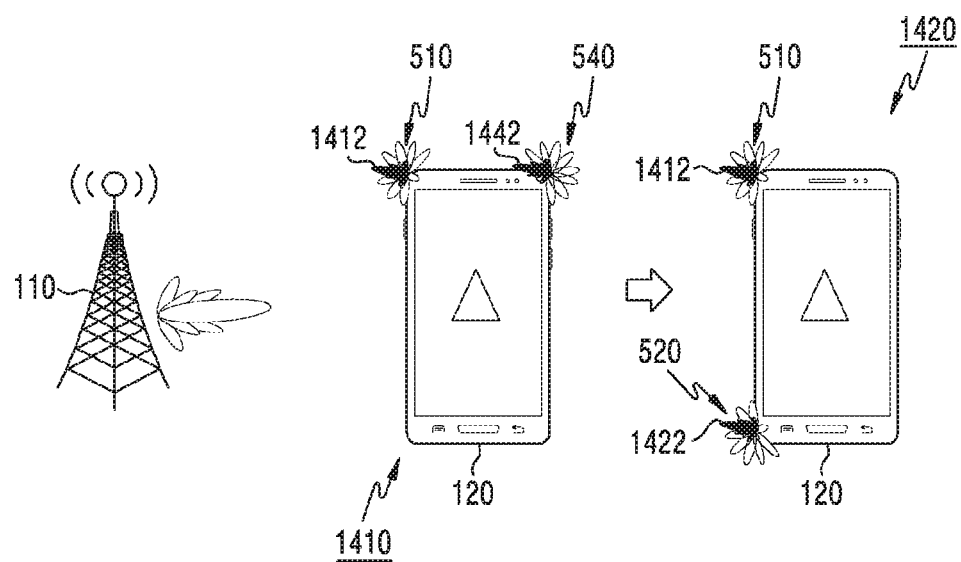
FIG. 14 shows an example of antennas that are activated based on the reception direction of a signal in a wireless communication system according to an embodiment of the disclosure.

FIG. 14 shows an example of antennas that are activated based on the reception direction of a signal in a wireless communication system according to an embodiment of the disclosure.

Referring to FIG. 14, the terminal 120 communicates with a base station 110 positioned at the left side of the terminal 120. First, as in state 1410, the terminal 120 activates the antennas at the left upper end 510 and the right upper end 540. A signal is received through a beam 1412 received to the antenna at the left upper end 510 and a beam 1442 received to the antenna at the right upper end 540. Since the beams 1412 and 1422 are oriented to the left side, as in state 1420, the terminal 120 performs antenna switching by activating the antennas at the left upper end 510 and the left lower end 520.

As described above, the antennas can be controlled based on the reception directions of signals. The reception directions of signals can be determined in accordance with various algorithms. For example, the reception directions of signals can be determined based on at least one of a best beam, the result of estimating an angle of arrival (AOA), the angle of the best beam, and the strength of a received signal. The best beam, which is a beam selected by a terminal based on the result of measuring beams, means a beam that provides the maximum channel quality or a channel quality over a critical value and is not necessarily the same as a beam that is actually used. At least any one of various combinations derived from the best beam, the result of estimating an angle of arrival, the angle of the best beam, and the strength of a received signal can be applied to determine the reception direction of the signal. Detailed examples of combinations are described hereafter with reference to FIGS. 15A to 17B. First, embodiments based on a best beam are described hereafter with reference to FIGS. 15A to 15C.

Figure 15A:
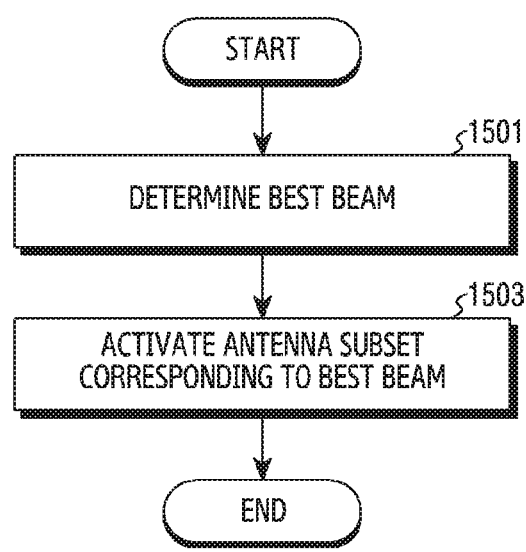
FIG. 15A is a flowchart illustrating control of antennas of a terminal based on a best beam in a wireless communication system according to an embodiment of the disclosure.

FIG. 15A is a flowchart illustrating control of antennas of a terminal based on a best beam in a wireless communication system according to an embodiment of the disclosure. FIG. 15A exemplifies an operation method of the terminal 120.

Referring to FIG. 15A, in operation 1501, a terminal determines a best beam. In order to determine a best beam, the terminal can repeatedly receive signals (e.g., a reference signal and a synchronization signal from a base state through a plurality of received beams and can measure the strength of the received signals. The terminal can determine the received beam that provides a signal having the maximum strength is the best beam. When a plurality of antennas is activated, one received beam for each antenna, that is, a plurality of received beams may be determined as best beams.

In operation 1503, the terminal activates an antenna subset corresponding to the best beam. That is, the terminal can activate at least one antenna corresponding to the received beam selected as the best beam based on the corresponding relationship between received beams and antenna subsets. The corresponding relationship of received beams and antenna subsets may be defined in advance and one antenna subset may correspond to a plurality of received beams or combinations of received beams.

Figure 15B:
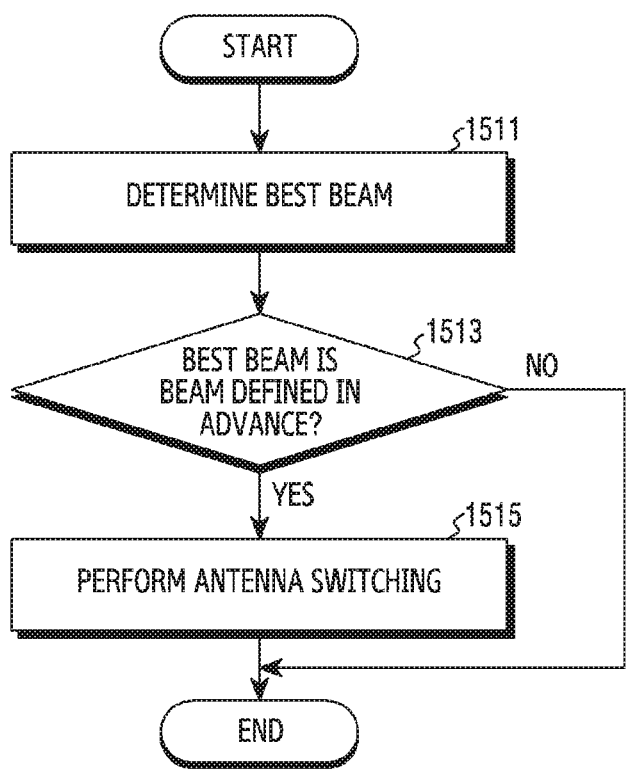
FIG. 15B is another flowchart illustrating control of antennas of a terminal based on a best beam in a wireless communication system according to an embodiment of the disclosure.

FIG. 15B is another flowchart illustrating control of antennas of a terminal based on a best beam in a wireless communication system according to an embodiment of the disclosure. FIG. 15B exemplifies an operation method of the terminal 120.

Referring to FIG. 15B, in operation 1511, a terminal determines a best beam. In order to determine a best beam, the terminal can repeatedly receive signals (e.g., a reference signal and a synchronization signal from a base state through a plurality of received beams and can measure the strength of the received signals. The terminal can determine the received beam that provides a signal having the maximum strength is the best beam. When a plurality of antennas is activated, one received beam for each antenna, that is, a plurality of received beams can be determined as best beams.

In operation 1513, the terminal determines whether the best beam is a beam defined in advance. In other words, the terminal determines whether the best beam is one of beams defined in advance. The beams defined in advance are a set of beams that cause antenna switching. For example, the beams defined in advance may include all or some of beams that can be used in a terminal. When the best beam is not a beam defined in advance, the terminal ends this procedure.

When the best beam is a beam defined in advance, the terminal performs antenna switching in operation 1515. That is, the terminal activates at least one antenna corresponding to the current best beam and deactivates another at least one antenna. Accordingly, the activated antenna can be changed. However, even if the best beam is a beam defined in advance, the activated antenna may not be changed when at least one antenna corresponding to the best beam determined in operation 1511 has already been activated. That is, the best beam that causes antenna switching may depend on which one or ones are the currently activated at least one antenna.

In the embodiments described with reference to FIGS. 15A and 15B, as the best beam is changed, the antenna to be activated can be changed. The quality of communication that is performed using a currently activated antenna may be further used as the condition for antenna switching. This is because even if the best beam is changed, antenna switching may not be necessary when the current communication quality is over a predetermined level. Therefore, according to another embodiment, when the strength of a signal at a currently activated antenna exceeds a critical value, a terminal may maintain the currently activated antenna even if the best beam is changed.

Figure 15C:
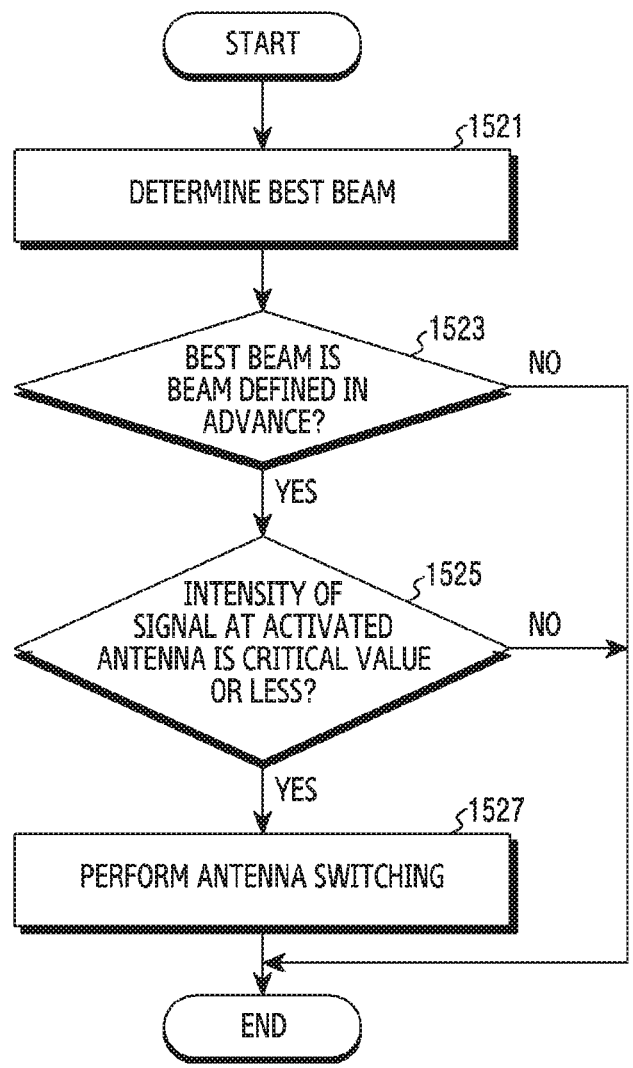
FIG. 15C is another flowchart illustrating control of antennas of a terminal based on a best beam in a wireless communication system according to an embodiment of the disclosure.

FIG. 15C is another flowchart illustrating control of antennas of a terminal based on a best beam in a wireless communication system according to an embodiment of the disclosure. FIG. 15C exemplifies an operation method of the terminal 120.

Referring to FIG. 15C, in operation 1521, a terminal determines a best beam. In order to determine a best beam, the terminal can repeatedly receive signals (e.g., a reference signal and a synchronization signal from a base state through a plurality of received beams and can measure the strength of the received signals. The terminal can determine the received beam that provides a signal having the maximum strength is the best beam. When a plurality of antennas is activated, one received beam for each antenna, that is, a plurality of received beams can be determined as best beams.

In operation 1523, the terminal determines whether the best beam is a beam defined in advance. In other words, the terminal determines whether the best beam is one of beams defined in advance. The beams defined in advance are a set of beams that cause antenna switching. For example, the beams defined in advance may include all or some of beams that can be used in a terminal. When the best beam is not a beam defined in advance, the terminal ends this procedure.

When the best beam is a beam defined in advance, the terminal determines whether the strength of the signal at the activated antenna is a critical value or less in operation 1525. The critical value may be defined as the strength value of a signal that provides a predetermined level of quality. Accordingly, when the strength of a signal exceeds the critical value, the current situation may be understood as a situation in which antenna switching is not necessarily required. Accordingly, when the strength of the signal at the activated antenna exceeds the critical value, the terminal ends this procedure.

When the strength of the signal at the activated antenna is the critical value or less, the terminal performs antenna switching in operation 1527. That is, the terminal activates at least one antenna corresponding to the current best beam and deactivates another at least one antenna. Accordingly, the activated antenna can be changed or switched at operation 1527. However, even if the best beam is a beam defined in advance, the activated antenna may not be changed when at least one antenna corresponding to the best beam determined in operation 1521 has already been activated. That is, the best beam that causes antenna switching may depend on which one or ones are the currently activated at least one antenna.

Figure 16A:
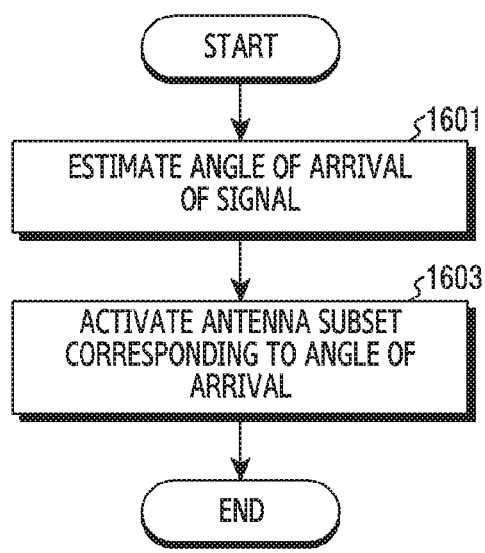
FIG. 16A is a flowchart illustrating control of antennas of a terminal based on estimation of the angle of arrival of a signal in a wireless communication system according to an embodiment of the disclosure.

FIG. 16A is a flowchart illustrating control of antennas of a terminal based on estimation of the angle of arrival of a signal in a wireless communication system according to an embodiment of the disclosure. FIG. 16A exemplifies an operation method of the terminal 120.

Referring to FIG. 16A, in operation 1601, a terminal estimates the angle of arrival of a signal. The angle of arrival can be estimated based on the result of measuring received beams of signals that are received from a base station.

In operation 1603, the terminal activates an antenna subset corresponding to the angle of arrival. That is, the terminal can activate at least one antenna corresponding to the estimated angle of arrival based on the corresponding relationship between angles of arrival and antenna subsets. The corresponding relationship between angles of arrival and antenna subsets may be defined in advance. For example, the terminal may find out a region to which the estimated angle of arrival belongs of a plurality of regions dividing all angles of arrival and then may activate an antenna subset corresponding to the found region.

Figure 16B:
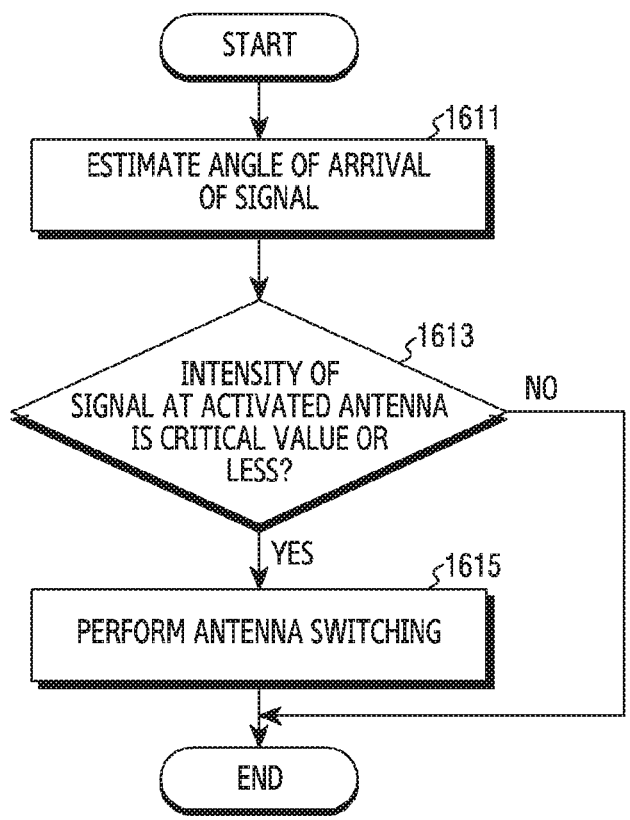
FIG. 16B is another flowchart illustrating control of antennas of a terminal based on estimation of the angle of arrival of a signal in a wireless communication system according to an embodiment of the disclosure.

FIG. 16B is another flowchart illustrating control of antennas of a terminal based on estimation of the angle of arrival of a signal in a wireless communication system according to an embodiment of the disclosure. FIG. 16B exemplifies an operation method of the terminal 120.

Referring to FIG. 16B, in operation 1611, a terminal estimates the angle of arrival of a signal. The angle of arrival can be estimated based on the result of measuring received beams of signals that are received from a base station.

In operation 1613, the terminal determines whether the strength of a signal at an activated antenna is a critical value or less. The critical value may be defined as the strength value of a signal that provides a predetermined level of quality. Accordingly, when the strength of a signal exceeds the critical value, the current situation may be understood as a situation in which antenna switching is not necessarily required. Accordingly, when the strength of the signal at the activated antenna exceeds the critical value, the terminal ends this procedure.

When the strength of the signal at the activated antenna is the critical value or less, the terminal performs antenna switching in operation 1615. That is, the terminal activates at least one antenna corresponding to the angle of arrival and deactivates another at least one antenna. That is, the terminal can activate at least one antenna corresponding to the estimated angle of arrival based on the corresponding relationship between the angles of arrival and antennas. The corresponding relationship between angles of arrival and antennas may be defined in advance. Accordingly, the activated antenna can be changed. However, when at least one antenna corresponding to the angle of arrival determined in operation 1611 has already been activated, the activated antenna may not be changed. That is, the angle of arrival that causes antenna switching may depend on which one or ones are the currently activated at least one antenna.

In the embodiments described with reference to FIGS. 16A and 16B, the terminal estimates the angle of arrival of a signal. The angle of arrival of a signal can be estimated in various ways. According to an embodiment, the angle of arrival of a signal may be estimated based on a best received beam. In this case, a terminal can find out the angle of the best received beam and determine the found angle as an angle of arrival.

According to another embodiment, the angle of arrival of a signal may be estimated based on the result of measuring a plurality of received beams. In this case, a terminal can determine the angle of arrival of the signal using a combination of values obtained by measuring the received beams. When a combination of values obtained by measuring received beams is used, even if the best received beams are the same, the reception directions may be differently estimated.

Figure 17A:
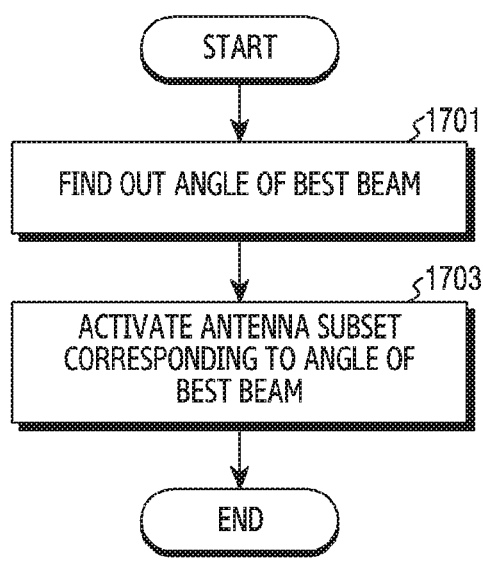
FIG. 17A is a flowchart illustrating control of antennas of a terminal based on the angle of a best beam in a wireless communication system according to an embodiment of the disclosure.

FIG. 17A is a flowchart illustrating control of antennas of a terminal based on the angle of a best beam in a wireless communication system according to an embodiment of the disclosure. FIG. 17A exemplifies an operation method of the terminal 120.

Referring to FIG. 17A, in operation 1701, a terminal finds out the angle of a best beam. Received beams have predetermined angles, so a terminal determines a best beam, thereby being able to find out the angle of the beam. That is, a terminal can convert the index of a best beam into an angle.

In operation 1703, the terminal activates an antenna subset corresponding to the angle of the best beam. That is, the terminal can activate at least one antenna corresponding to the angle of the best beam based on the corresponding relationship between the angles of best beams and antenna subsets. The corresponding relationship between the angles of best beams and antenna subsets may be defined in advance. For example, the terminal may find out a region to which the angle of a best beam belongs of a plurality of regions dividing the angles of available beams and then may activate an antenna subset corresponding to the found region.

Figure 17B:
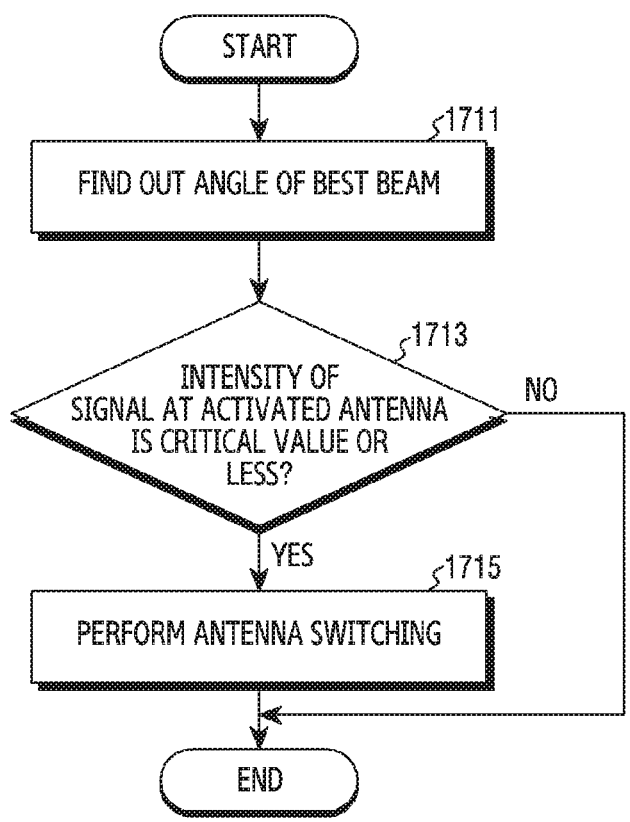
FIG. 17B is another flowchart illustrating control of antennas of a terminal based on the angle of a best beam in a wireless communication system according to an embodiment of the disclosure.

FIG. 17B is another flowchart illustrating control of antennas of a terminal based on the angle of a best beam in a wireless communication system according to an embodiment of the disclosure. FIG. 17B exemplifies an operation method of the terminal 120.

Referring to FIG. 17B, in operation 1711, a terminal finds out the angle of a best beam. Received beams have predetermined angles, so a terminal determines a best beam, thereby being able to find out the angle of the beam.

In operation 1713, the terminal determines whether the strength of a signal at an activated antenna is a critical value or less. The critical value may be defined as the strength value of a signal that provides a predetermined level of quality. Accordingly, when the strength of a signal exceeds the critical value, the current situation may be understood as a situation in which antenna switching is not necessarily required. Accordingly, when the strength of the signal at the activated antenna exceeds the critical value, the terminal ends this procedure.

When the strength of the signal at the activated antenna is the critical value or less, the terminal performs antenna switching in operation 1715. That is, the terminal activates at least one antenna corresponding to the angle of a best beam and deactivates another at least one antenna. That is, the terminal can activate at least one antenna corresponding to the angle of the best beam based on the corresponding relationship between the angles of best beams and antennas. The corresponding relationship between the angles of best beams and antennas may be defined in advance. Accordingly, the activated antenna can be changed. However, when at least one antenna corresponding to the angle found out in operation 1711 has already been activated, the activated antenna may not be changed. That is, the angle that causes antenna switching may depend on which one or ones are the currently activated at least one antenna.

In the embodiments described with reference to FIGS. 16A to 17B, antenna switching based on a received signal or the angle of a best beam is performed. The resolution of an angle for antenna switching and the resolution of an estimated or found angle may be different from each other. For example, even if an estimated or found angle is changed, an activated antenna may not be changed as long as the amount of change of the angle is less than a critical value. That is, not all changes of an estimated or found angle may not cause antenna switching.

In the various embodiments described above, a structure in which antennas are installed at four corners (e.g., positions 510, 520, 530, and 540) of a terminal was exemplified. Alternatively, a structure in which one antenna is installed adjacent to the center of the front side or the rear side of a terminal, as shown in FIG. 18, may be considered.

Figure 18:
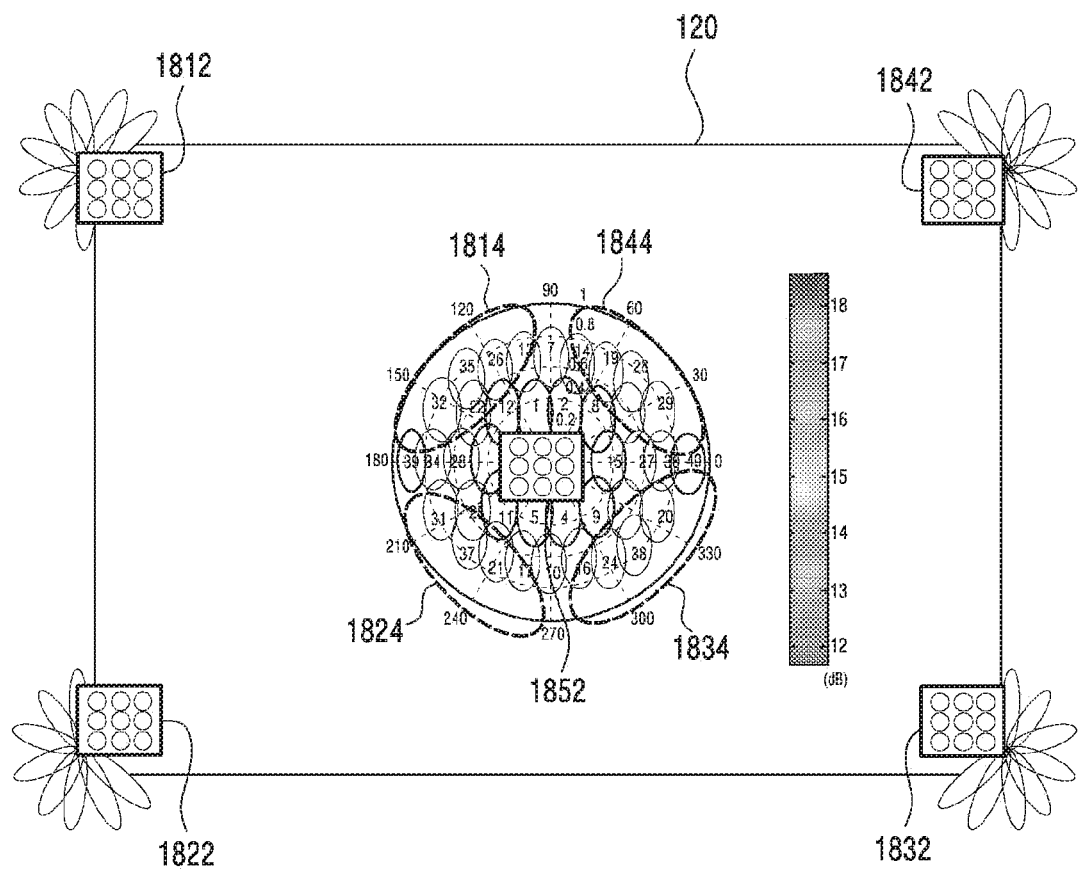
FIG. 18 shows another arrangement of antennas on a terminal in a wireless communication system according to an embodiment of the disclosure.

FIG. 18 shows another arrangement of antennas on a terminal in a wireless communication system according to an embodiment of the disclosure.

Referring to FIG. 18, a first antenna 1812, a second antenna 1822, a third antenna 1832, and a fourth antenna 1842 are arranged at four corners of a terminal 120, and a fifth antenna 1852 is arranged adjacent to the center of the terminal 120. The fifth antenna 1852 may be arranged on the front side (e.g., on a side where a display is arranged) or the rear side (e.g., on a side where a cover is arranged). When the fifth antenna 1852 is arranged on the front side, the fifth antenna 1852 may be referred to as a 'display antenna'.

In general, a gain of a beam that is formed perpendicularly to the shape of an antenna (e.g., a beam that is formed at 90° to the plane of an antenna) is relatively excellent, and the smaller the plane of an antenna and the angle of a beam direction, the smaller the gain. Accordingly, when beams for regions 1814, 1824, 1834, and 1844 positioned at sides of the fifth antenna 1852 are selected as best beams or the reception directions of signals in the regions 1814, 1824, 1834, and 1844 are estimated, it is possible to provide higher communication quality by using one of the first antenna 1812, the second antenna 1822, the third antenna 1832, and the fourth antenna 1842 arranged at the four corners. Accordingly, in this case, antenna switching may be performed from the fifth antenna 1852 to at least one of the first antenna 1812, the second antenna 1822, the third antenna 1832, and the fourth antenna 1842. For example, a first region 1814 corresponds to the first antenna 1812, a second region 1824 corresponds to the second antenna 1822, a third region 1834 corresponds to the third antenna 1832, and a fourth region 1844 corresponds to the fourth antenna 1842.

The fifth antenna 1852 arranged adjacent to the center, as described above, may be used as a monitoring antenna for determining an antenna to be activated. A related embodiment is described hereafter with reference to FIG. 19.

Figure 19:
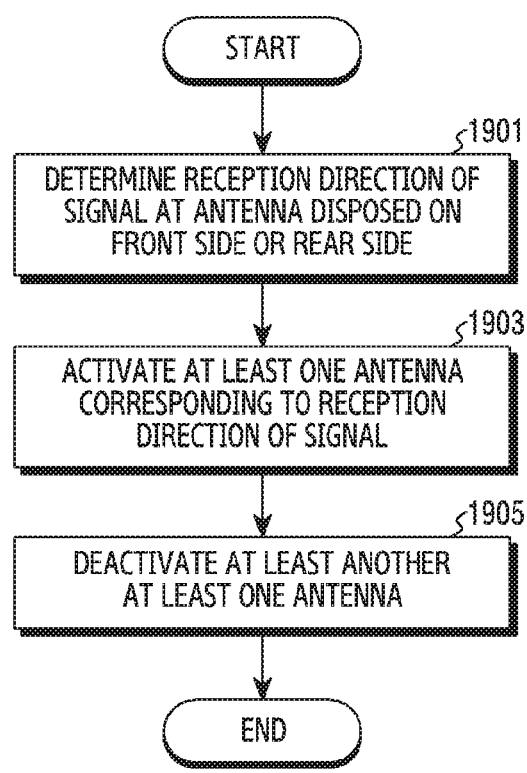
FIG. 19 is a flowchart illustrating control of antennas of a terminal based on a best beam in a wireless communication system according to an embodiment of the disclosure.

FIG. 19 is a flowchart illustrating control of antennas of a terminal based on a best beam in a wireless communication system according to an embodiment of the disclosure. FIG. 19 exemplifies an operation method of the terminal 120.

Referring to FIG. 19, in operation 1901, a terminal determines the reception direction of a signal at an antenna arranged on the front side or the rear side. For the convenience of description, an antenna arranged on a front side or a rear side is hereafter referred to as a 'monitoring antenna'. That is, a terminal estimates the reception direction of a signal with respect to a monitoring antenna, with the monitoring antenna activated.

In operation 1903, the terminal activates at least one antenna corresponding to the reception direction of the signal at the monitoring antenna. For example, the terminal can activate at least one antenna corresponding to the reception direction of the signal. Accordingly, at least one antenna can be activated additionally or instead of a currently activated antenna. For example, when the reception direction of a signal corresponds to a side of a monitoring antenna (e.g., one of the regions 1814, 1824, 1834, and 1844), the monitoring antenna and another at least one antenna may be activated.

In operation of 1905, the terminal deactivates another at least one antenna of the signal. For example, the terminal can deactivate at least one antenna not corresponding to the reception direction of the signal. Accordingly, at least one antenna can be deactivated additionally or instead of a currently deactivated antenna. For example, when the reception direction of a signal corresponds to a side of a monitoring antenna (e.g., one of the regions 1814, 1824, 1834, and 1844), the monitoring antenna may be deactivated.

Figure 20:
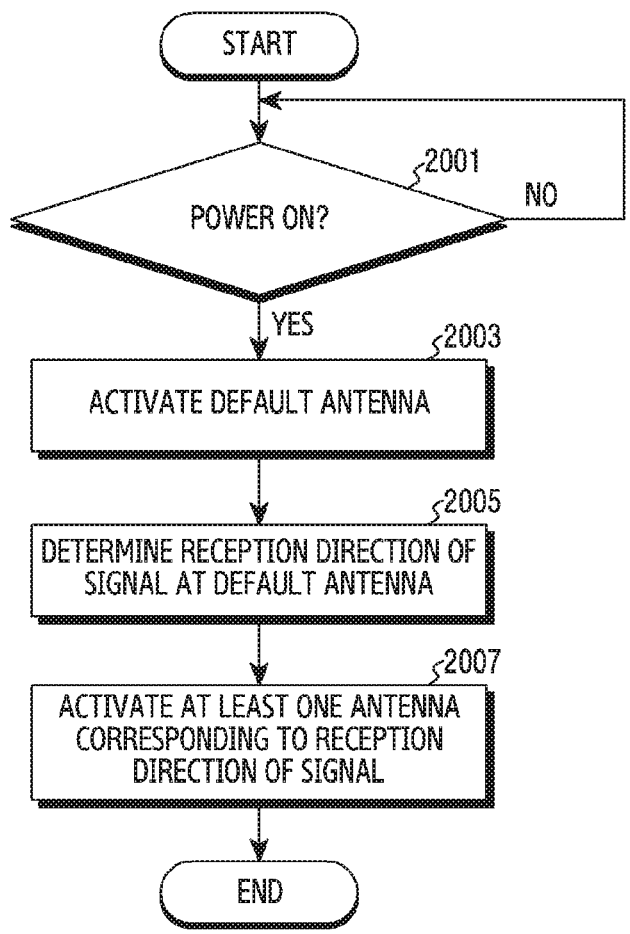
FIG. 20 is a flowchart illustrating control of antennas using a default antenna in a wireless communication system according to an embodiment of the disclosure.

FIG. 20 is a flowchart illustrating control of antennas using a default antenna in a wireless communication system according to an embodiment of the disclosure. FIG. 20 exemplifies an operation method of the terminal 120.

Referring to FIG. 20, in operation 2001, a terminal determines whether power is turned on. That is, the terminal checks whether power comes out of an off-state. Accordingly, the terminal is booted and some settings can be initialized.

In operation 2003, the terminal activates a default antenna. That is, as power is turned on, pre-defined defaults can be applied, and for example, the default antenna defined to be used in initialization can be activated. For example, the default antenna may be an antenna arranged adjacent to the center of the front side or a rear side of a terminal.

In operation 2005, the terminal determines the reception direction of a signal at the default antenna. The reception direction of a signal may be determined based on the result of measuring received beams. For example, the terminal can determine the reception direction of a signal based on at least one of a best beam, the result of estimating an angle of arrival, the angle of the best beam, and the strength of a received signal.

In operation 2007, the terminal activates at least one antenna corresponding to the reception direction of the signal. Accordingly, at least one antenna can be activated additionally or instead of a currently activated antenna. For example, when the default antenna is a monitoring antenna and the reception direction of a signal corresponds to a side of the monitoring antenna (e.g., one of the regions 1814, 1824, 1834, and 1844), the monitoring antenna and another at least one antenna may be activated.

As described above, antennas can be controlled based on various items of state information. Changing an activated antenna may cause a change of a communication channel. Accordingly, antenna switching may be performed at an instant with a relatively small burden on changing a communication channel. A wireless communication system according to various embodiments supports frame-based communication. In detail, a base station transmits signals through a structure divided into frames or subframes and transmits signals for performing out-of-data communication through some of the frames or subframes. For example, an out-of-data signal may include at least one of a signal for synchronization/synchronization tracking, a signal for beam measurement/tracking, a signal used for automatic gain control (AGC), and a signal used for beam changing.

An out-of-data signal is usually related with synchronization and measurement, and synchronization and measurement are relatively sensitive to channel changing due to antenna switching.

Figure 21A:
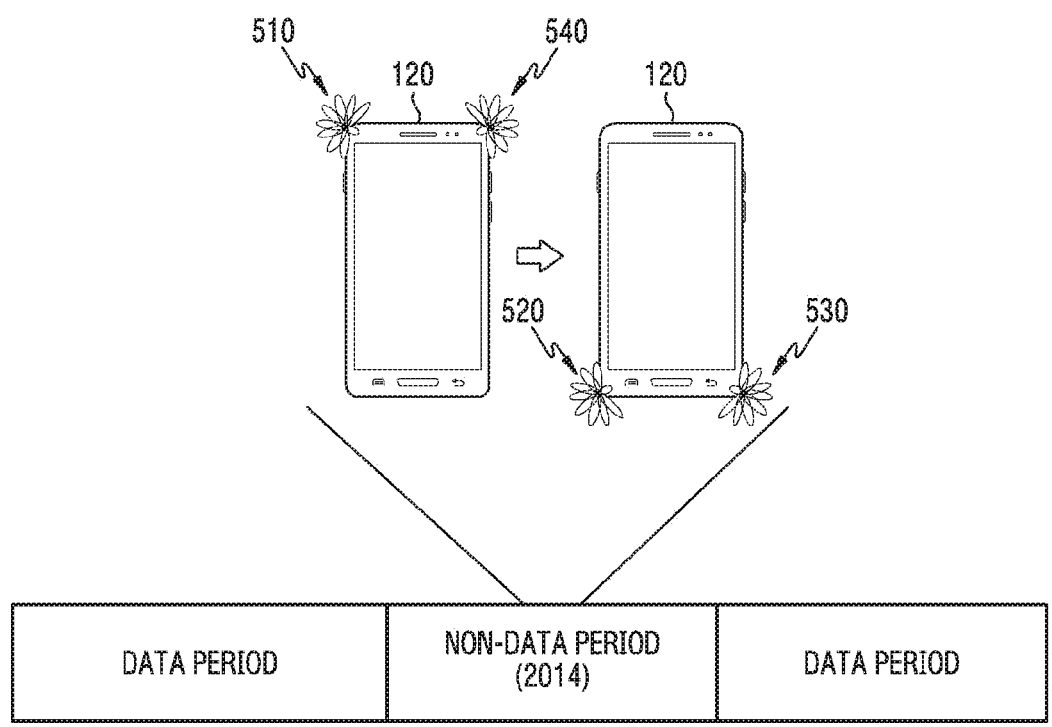
FIG. 21A shows an example of performing antenna switching in a wireless communication system according to an embodiment of the disclosure.

FIG. 21A shows an example of performing antenna switching in a wireless communication system according to an embodiment of the disclosure.

Referring to FIG. 21A, when beam switching is performed in a non-data period 2104 in which an out-of-data signal is transmitted, the possibility of failure of synchronization and measurement may increase. The non-data period 2104 may be referred to as a 'preamble period'. An RF circuit for changing a setting about beamforming (e.g., changing a beam direction) may be controlled in synchronization and measurement, but when antenna switching is simultaneously performed, there is possibility of RF malfunction. Hereafter, influence of antenna switching is described through a change in throughput with respect to FIG. 21B.

Figure 21B:
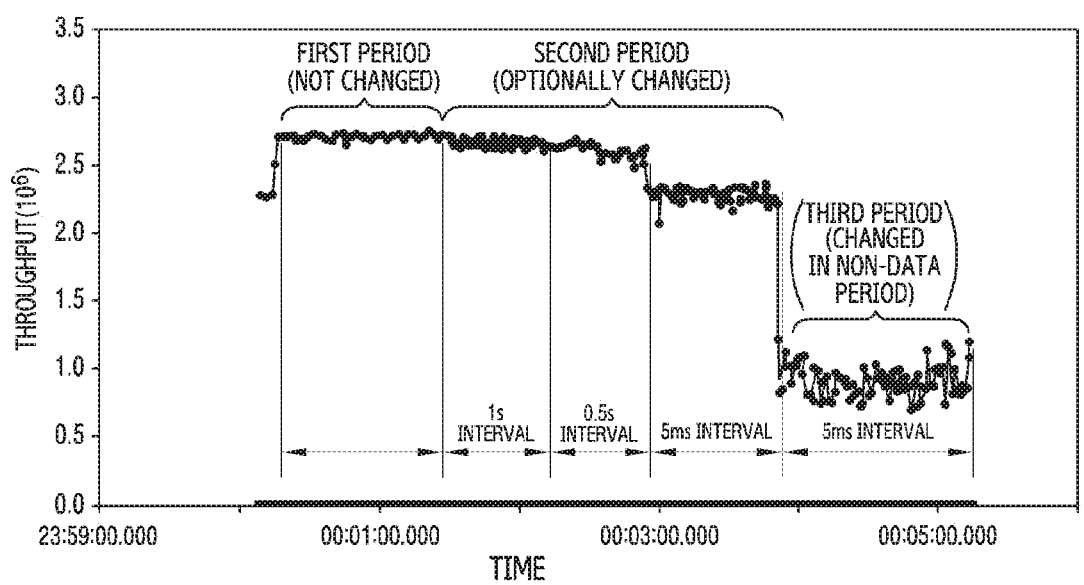
FIG. 21B shows an example of a change of throughput at the instant of antenna switching in a wireless communication system according to an embodiment of the disclosure.

FIG. 21B shows an example of a change of throughput at the instant of antenna switching in a wireless communication system according to an embodiment of the disclosure. Referring to FIG. 21B, in a second period, the instant of antenna switching is optionally controlled and antenna switching is performed in not only a non-data period, but also a data period. It can be seen in the second period that, as compared with a first period without antenna switching, similar throughput is shown at the interval of 1 sec, and the smaller interval of antenna switching from 0.5 sec to 5 ms, the smaller the throughput. A third period is a period in which antenna switching is performed only in a non-data period, and in this case, it can be seen that the throughput rapidly decreases. Accordingly, the instant where antenna switching is allowed may be appropriately controlled.

Figure 22:
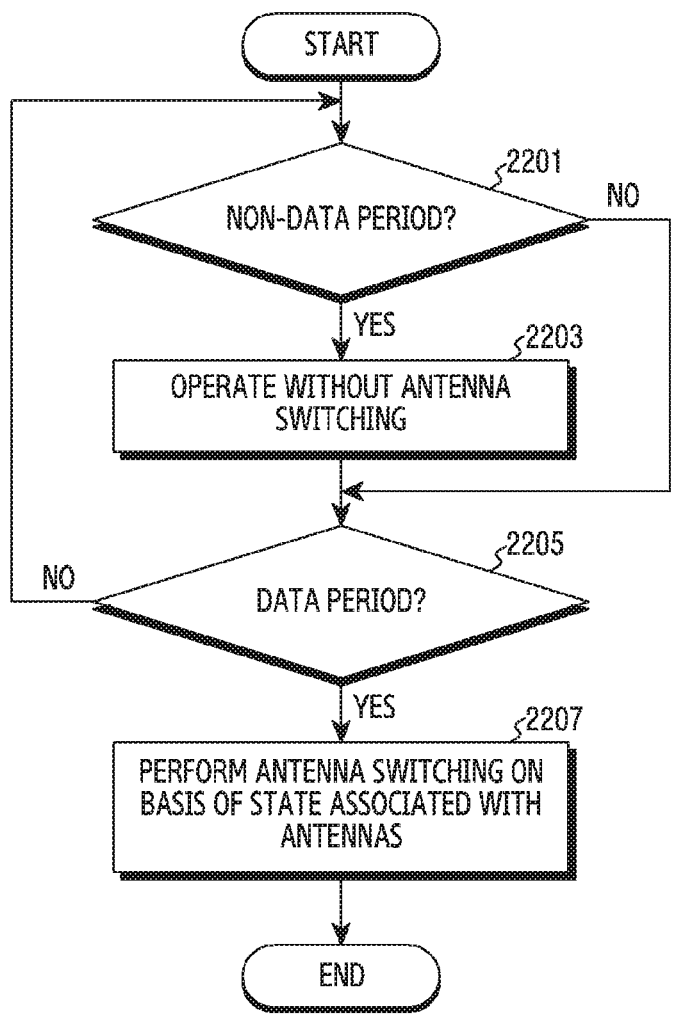
FIG. 22 is a flowchart illustrating control of an antenna switching allowance instant in a terminal in a wireless communication system according to an embodiment of the disclosure.

FIG. 22 is a flowchart illustrating control of an antenna switching allowance instant in a terminal in a wireless communication system according to an embodiment of the disclosure. FIG. 22 exemplifies an operation method of the terminal 120.

Referring to FIG. 22, in operation 2201, a terminal checks whether it is a non-data period. The terminal is synchronized with a base station, so the structure of a frame and a subframe can be seen. Accordingly, the terminal can determine whether the current period is a period in which data are transmitted or a period in which signals for synchronization, measurement, etc. are transmitted.

If it is a non-data period, in operation 2203, the terminal operates without antenna switching. That is, the terminal stops an operation for antenna switching. In other words, the terminal temporarily disables an antenna switching function. The terminal can perform operations required in the non-data period such as synchronization, synchronization tracking, beam measurement, and beam tracking.

In operation 2205, the terminal checks whether it is a data period. The terminal is synchronized with a base station, so the structure of a frame and a subframe can be seen. Accordingly, the terminal can determine whether the current period is a period in which data are transmitted or a period in which signals for synchronization, measurement, etc. are transmitted.

When it is a data period, in operation 2207, the terminal performs antenna switching based on state associated with antennas. That is, the terminal can perform an operation for antenna switching, if necessary, in addition to transmitting and receiving data. However, antenna switching is not necessarily performed in the data period. That is, if conditions for antenna switching are not satisfied, the terminal can operate without antenna switching.

As described above, antenna switching can be selectively enabled, depending on which period on the frame the current period is. Selectively enabling the antenna switching function may be performed jointly with various conditions for antenna switching described above. At least two or more of the various conditions for antenna switching described above may be jointly performed. Various embodiments in which the various embodiments described above are jointly performed are described hereafter.

Figure 23:
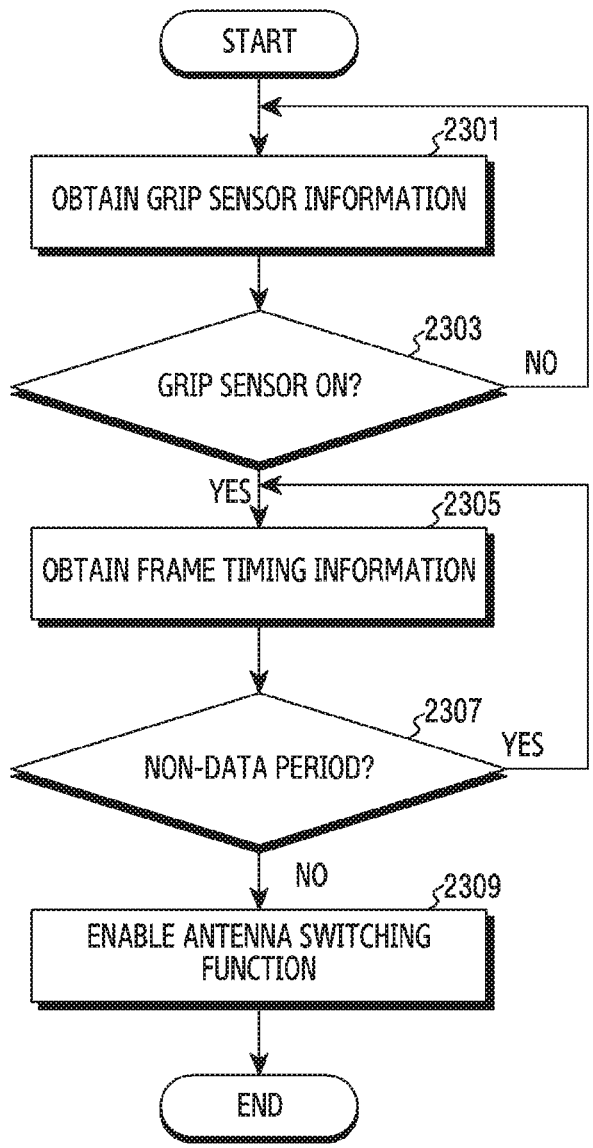
FIG. 23 is a flowchart for performing antenna switching in a terminal using a grip sensor in a wireless communication system according to an embodiment of the disclosure.

FIG. 23 is a flowchart for performing antenna switching in a terminal using a grip sensor in a wireless communication system according to an embodiment of the disclosure. FIG. 23 exemplifies an operation method of the terminal 120.

Referring to FIG. 23, in operation 2301, a terminal obtains grip sensor information. In other words, the terminal obtains sensor data generated by grip sensors installed at positions where a plurality of antennas is arranged.

In operation 2303, the terminal determines whether at least one grip sensor is in an on-state. In other words, the terminal determines whether at least one grip sensor has sensed a grip state. That is, the terminal determines whether at least one of the positions where the grip sensors are installed has been gripped.

When at least one grip sensor is an on-state, in operation 2305, the terminal obtains frame timing information. That is, the terminal checks which period of a frame the current frame is, that is, checks information for checking whether it is a data period or a non-data period.

In operation 2307, the terminal checks whether the current period is a non-data period. When the current period is a non-data period, antenna switching may not be performed. Accordingly, the terminal returns to operation 2305.

When the current period is not a non-data period, that is, is a data period, the terminal enables the antenna switching function in operation 2309. Accordingly, when predetermined conditions are satisfied, the terminal can perform antenna switching.

Figure 24:
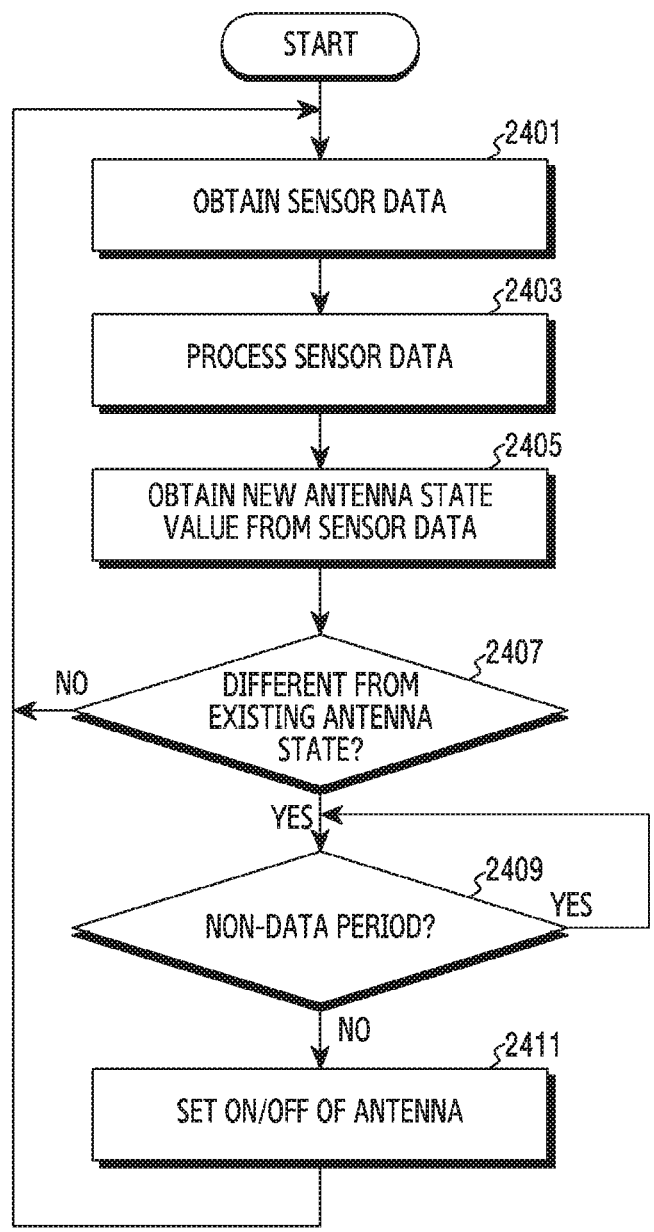
FIG. 24 is a flowchart for performing antenna switching in a terminal using sensor data in a wireless communication system according to an embodiment of the disclosure.

FIG. 24 is a flowchart for performing antenna switching in a terminal using sensor data in a wireless communication system according to an embodiment of the disclosure. FIG. 24 exemplifies an operation method of the terminal 120.

Referring to FIG. 24, in operation 2401, a terminal obtains sensor data. The sensor data are generated by a sensor (e.g., a grip sensor, an acceleration sensor, and a gyro sensor) and mean data corresponding to physical changes applied to the terminal.

In operation 2403, the terminal processes the sensor data. In other words, the terminal generates information showing physical changes by processing the sensor data. For example, the terminal generates information for determining whether to perform antenna switching. For example, the terminal can generate at least one of information showing a grip position and information showing relative positions of antennas.

In operation 2405, the terminal obtains a new antenna state value from the sensor data. The antenna state value is information that gives an instruction to activate which antennas and deactivate which antennas or information that gives an instruction whether to activate antennas. Antenna state values corresponding to the processed sensor data can be defined in advance and the terminal can search for antenna state values from mapping information defined in advance.

In operation 2407, the terminal determines whether an existing antenna state and the new antenna state are different. That is, the terminal determines whether to change the activated antenna. If the existing antenna state and the new antenna state are the same, the terminal returns to operation 2401.

However, if the existing antenna state and the new antenna state are different, the terminal determines whether it is a non-data period in operation 2409. When the current period is a non-data period, antenna switching may not be performed. Accordingly, the terminal does not progress to operation 2411.

When the current period is not a non-data period, that is, is a data period, the terminal sets on/off of the antennas in operation 2411. That is, the terminal activates at least one antenna and deactivates another at least one antenna based on the new antenna state.

Figure 25:
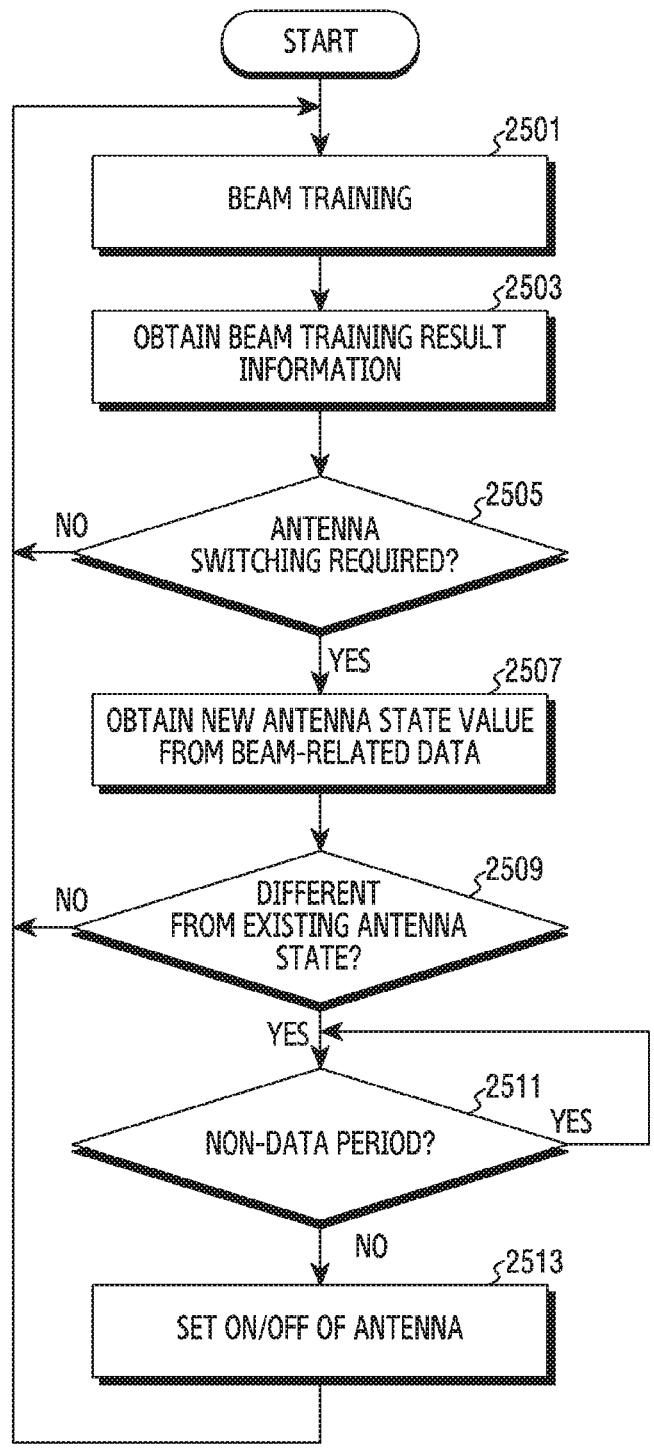
FIG. 25 is a flowchart for performing antenna switching in a terminal using beam-related information in a wireless communication system according to an embodiment of the disclosure.

FIG. 25 is a flowchart for performing antenna switching in a terminal using beam-related information in a wireless communication system according to an embodiment of the disclosure. FIG. 25 exemplifies an operation method of the terminal 120.

Referring to FIG. 25, in operation 2501, a terminal performs beam training. The beam training, which is a procedure for determining a best beam, may include reception of reference signals and beam sweeping. If a transmission beam is used, the beam training procedure may include transmission of reference signals and reception of feedback.

In operation 2503, the terminal obtains information about the result of the beam training. The information about the result of the beam training may include at least one of information about a best beam, information about the angle of arrival of a signal, and information about the reception strength of a signal. Accordingly, the terminal can find out the beam-related state.

In operation 2505, the terminal determines whether antenna switching is required. For example, the terminal determines whether the state found out from the beam-related information satisfies a condition defined in advance. For example, the condition defined in advance may be defined as at least one of that the reception strength of a signal received through the currently activated antenna is a critical value or less, the angle of a received signal or a best received beam is a critical value or more, and a best received beam is one of received beams defined in advance. If antenna switching is not required, the terminal returns to operation 2501.

On the contrary, when antenna switching is required, the terminal obtains a new antenna state value from beam-related data in operation 2507. The antenna state value is information that gives an instruction to activate which antennas and deactivate which antennas or information that gives an instruction whether to activate antennas. Antenna state values corresponding to the beam-related data can be defined in advance and the terminal can search for antenna state values from mapping information defined in advance.

In operation 2509, the terminal determines whether an existing antenna state and the new antenna state are different. That is, the terminal determines whether to change the activated antenna. If the existing antenna state and the new antenna state are the same, the terminal returns to operation 2501.

However, if the existing antenna state and the new antenna state are different, the terminal determines whether it is a non-data period in operation 2511. When the current period is a non-data period, antenna switching may not be performed. Accordingly, the terminal does not progress to operation 2513.

When the current period is not a non-data period, that is, is a data period, the terminal sets on/off of the antennas in operation 2513. That is, the terminal activates at least one antenna and deactivates another at least one antenna based on the new antenna state.

Figure 26:
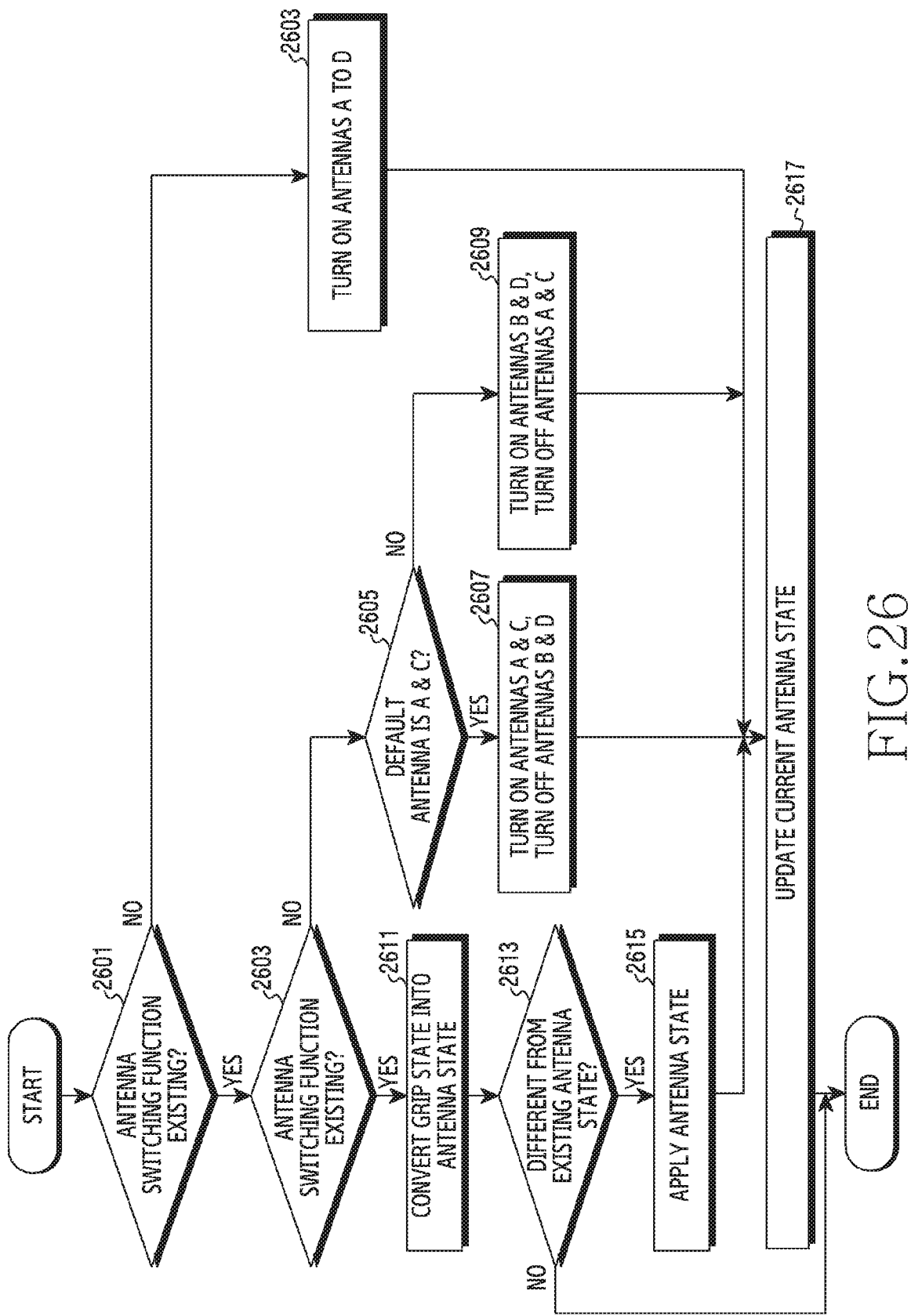
FIG. 26 is a flowchart for performing antenna switching in a terminal using a grip state, depending on whether an antenna switching function exists, in a wireless communication system according to an embodiment of the disclosure.

FIG. 26 is a flowchart for performing antenna switching in a terminal using a grip state, depending on whether an antenna switching function exists, in a wireless communication system according to an embodiment of the disclosure. FIG. 26 exemplifies an operation method of the terminal 120.

Referring to FIG. 26, in operation 2601, a terminal determines whether an antenna switching function exists. For example, the terminal can determine whether an antenna switching function exists based on the model number or specification information of the device.

When an antenna switching function does not exist, the terminal turns on antennas A to D in operation 2603. In other words, the terminal can activate all antennas. When an antenna switching function exists, the terminal checks whether the antenna switching function has been enabled, in operation 2605. The antenna switching function can be selectively enabled.

When the antenna switching function has not been enabled, the terminal determines whether antennas A and C are default antennas in operation 2605. When the antennas A and C are default antennas, the terminal progresses to operation 2607, thereby turning on the antennas A and C and turning off antennas B and D. When the antennas A and C are not default antennas, that is, when the antennas B and D are default antennas, the terminal progresses to operation 2609, thereby turning on the antennas B and D and turning off the antennas A and C.

When the antenna switching function has been enabled, the terminal converts a grip state into an antenna state in operation 2611. In operation 2613, the terminal determines whether the converted antenna state and an existing antenna state are the different. When the converted antenna state and an existing antenna state are the same, the terminal ends this procedure. When converted antenna state and an existing antenna state are different, the terminal applies the converted antenna state in operation 2615. In other words, the terminal activates at least one antenna that is indicated by the converted antenna state. In operation 2617, the terminal updates the current antenna state. That is, the terminal changes the information about the antenna state to indicate the currently activated antennas.

Figure 27:
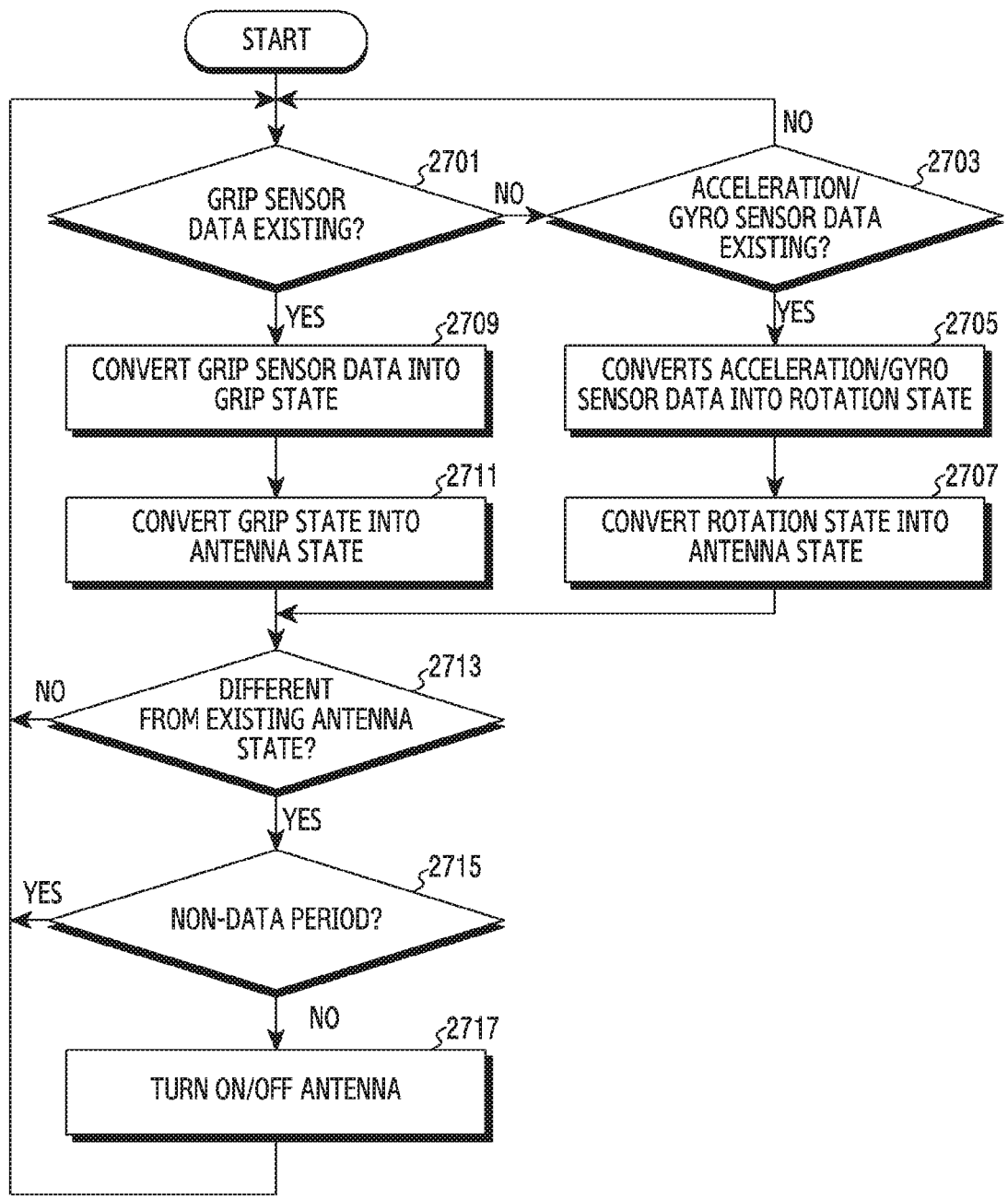
FIG. 27 is a flowchart for performing antenna switching in a terminal using two types of sensor data in a wireless communication system according to an embodiment of the disclosure.

FIG. 27 is a flowchart for performing antenna switching in a terminal using two types of sensor data in a wireless communication system according to an embodiment of the disclosure. FIG. 27 exemplifies an operation method of the terminal 120.

Referring to FIG. 27, in operation 2701, a terminal determines whether grip sensor data exist. When grip sensor data do not exist, the terminal determines whether acceleration/gyro sensor data exist in operation 2703. The fact that grip sensor data exist means that grip has occurred at at least one position where a grip sensor is arranged. The fact that acceleration/gyro sensor data exist means that rotation/movement of the terminal has occurred.

When grip sensor data do not exist and acceleration/gyro sensor data exist, the terminal converts the acceleration/gyro sensor data into a rotation state in operation 2705. The rotation state is information showing which portion of the terminal is positioned at the top, where the relative positions of antenna are, etc. In operation 2707, the terminal converts the rotation state into an antenna state.

When grip sensor data do not exist, the terminal converts the grip sensor data into a grip state in operation 2709. The grip state is information showing which positions of the terminal has been gripped, whether the antennas of the terminal have been gripped, etc. In operation 2711, the terminal converts the grip state into an antenna state.

In operation 2713, the terminal determines whether an existing antenna state and the new antenna state are different. That is, the terminal determines whether to change the activated antenna. If the existing antenna state and the new antenna state are the same, the terminal returns to operation 2701.

However, if the existing antenna state and the new antenna state are different, the terminal determines whether it is a non-data period in operation 2715. When the current period is a non-data period, antenna switching may not be performed. Accordingly, the terminal does not progress to operation 2717.

When the current period is not a non-data period, that is, is a data period, the terminal sets on/off of the antennas in operation 2717. That is, the terminal activates at least one antenna and deactivates another at least one antenna based on the new antenna state.

In the embodiment described with reference to FIG. 27, whether grip sensor data exist is determined first before whether acceleration/gyro sensor data exist. That is, grip sensor data means blockage of a link, so if grip sensor data exist, priority is given to the grip sensor data. Accordingly, whether grip sensor data exist is determined first. However, according to another embodiment, high priority may be given to acceleration/gyro sensor data and whether acceleration/gyro sensor data exist may be determined first.

Figure 28:
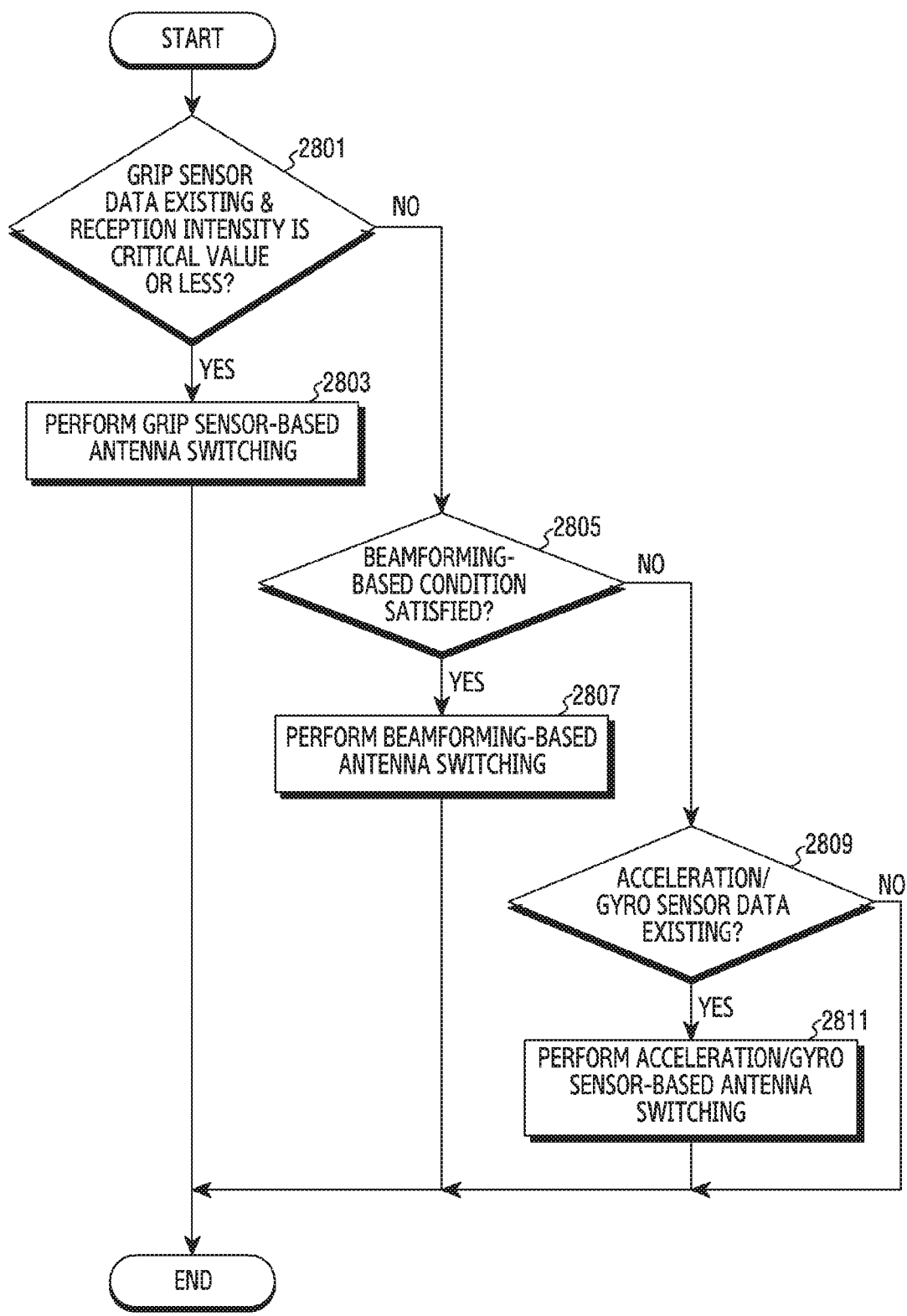
FIG. 28 is a flowchart for performing antenna switching in a terminal using two types of sensor data and beamforming-related data in a wireless communication system according to an embodiment of the disclosure.

FIG. 28 is a flowchart for performing antenna switching in a terminal using two types of sensor data and beamforming-related data in a wireless communication system according to an embodiment of the disclosure. FIG. 28 exemplifies an operation method of the terminal 120.

Referring to FIG. 28, in operation 2801, a terminal determines whether grip sensor data exist and the reception strength of a signal is a critical value or less. The fact that grip sensor data exist means that grip occurs at at least one position where a grip sensor is arranged. When grip sensor data exist and the reception strength of a signal is the critical value or less, the terminal performs grip sensor-based antenna switching in operation 2803. That is, the terminal activates at least one antenna, depending on grip states of antennas.

When grip sensor data do not exist or the reception strength of a signal exceeds the critical value, the terminal determines whether a condition of beamforming-based antenna switching is satisfied in operation 2805. The condition of beamforming-based antenna switching may be determined based on at least one of a best beam, the angle of the best beam, the arrival angle of a signal, the reception strength of a signal. When the condition of beamforming-based antenna switching is satisfied, the terminal performs beamforming-based antenna switching in operation 2807. That is, the terminal selects and controls at least one antenna to be activated based on at least one of a best beam, the angle of the best beam, and the arrival angle of a signal.

When the condition of beamforming-based antenna switching is not satisfied, the terminal determines whether acceleration/gyro sensor data exist in operation 2809. The fact that acceleration/gyro sensor data exist means that rotation/movement of the terminal has occurred. When acceleration/gyro sensor data exist, the terminal performs acceleration/gyro sensor data-based antenna switching in operation 2811. That is, the terminal activates at least one antenna, depending on relative positions of antennas.

In the embodiment described with reference to FIG. 28, whether grip sensor data exist is determined first. That is, the fact that grip sensor data exist and reception strength is low means blockage of a link, so if grip sensor data exist, the highest priority is given to the grip sensor data. However, according to another embodiment, higher priority may be given to the beamforming-based antenna switching or the acceleration/gyro sensor data-based antenna switching.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random-access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating a terminal in a wireless communication system, the method comprising:
   detecting a plurality of states associated with a plurality of antennas arranged in the terminal;
   activating at least one first antenna, among the plurality of antennas, based on the plurality of states associated with the plurality of antennas; and
   deactivating at least one second antenna, among the plurality of antennas, based on the plurality of states associated with the plurality of antennas,
   wherein the plurality of states are based on a relative position associated with each antenna of the plurality of antennas arranged in the terminal, and
   wherein the at least one first antenna is activated if the at least one first antenna is positioned upward of the terminal.

2. The method of claim 1, wherein the plurality of states associated with the plurality of antennas are determined based on at least one of a signal transmitted or received through at least one antenna, among the plurality of antennas, that is currently activated and sensor data generated by at least one sensor arranged in the terminal.

3. The method of claim 1, wherein the at least one second antenna is deactivated if a position where the at least one second antenna is installed is blocked by another object.

4. The method of claim 1, wherein the at least one first antenna is activated if the at least one first antenna is positioned higher than another at least one antenna among the plurality of antennas.

5. The method of claim 1, wherein the at least one first antenna is activated if the at least one first antenna is positioned over an image displayed on the terminal.

6. The method of claim 1, wherein the at least one first antenna is activated if the at least one first antenna is positioned in a reception direction of a signal from a base station.

7. The method of claim 1, wherein the at least one first antenna is activated based on at least one of a best beam, a result of estimating an angle of arrival (AOA), an angle of the best beam, or strength of a received signal.

8. The method of claim 1,
   wherein the detecting of the plurality of states associated with the plurality of antennas further includes determining a reception direction of a signal at a default antenna, among the plurality of antennas, that is activated if the terminal is turned on, and
   wherein the at least one first antenna includes an antenna corresponding to the reception direction of the signal at the default antenna.

9. The method of claim 8, wherein the default antenna is arranged at a center of a front side or a rear side of the terminal.

10. The method of claim 1,
    wherein activation of the at least one first antenna and deactivation of the at least one second antenna are allowed during a non-data period, and
    wherein the non-data period includes a period in which at least one of a signal for synchronization or synchronization tracking, a signal for beam measurement or tracking, a signal used for automatic gain control (AGC), or a signal used for beam changing is received.

11. A terminal in a wireless communication system, the terminal comprising:
    a plurality of antennas;
    a transceiver coupled to the plurality of antennas; and
    at least one processor coupled to the transceiver,
    wherein the at least one processor is configured to:
       detect a plurality of states associated with the plurality of antennas,
       activate at least one first antenna, among the plurality of antennas, based on the plurality of states associated with the plurality of antennas, and
       deactivate at least one second antenna, among the plurality of antennas, based on the plurality of states associated with the plurality of antennas,
       wherein the plurality of states are based on a relative position associated with each antenna of the plurality of antennas arranged in the terminal, and
       wherein the at least one first antenna is activated if the at least one first antenna is positioned upward of the terminal.

12. The terminal of claim 11, wherein the plurality of states associated with the plurality of antennas are determined based on at least one of a signal transmitted or received through currently activated at least one antenna or sensor data generated by at least one sensor arranged in the terminal.

13. The terminal of claim 11, wherein the at least one second antenna is deactivated if a position where the at least one second antenna is installed is blocked by another object.

14. The terminal of claim 11, wherein the at least one first antenna is activated if the at least one first antenna is positioned higher than another at least one antenna, among the plurality of antennas.

15. The terminal of claim 11, wherein the at least one first antenna is activated if the at least one first antenna is positioned over an image displayed on the terminal.

16. The terminal of claim 11, wherein the at least one first antenna is activated if the at least one first antenna is positioned in a reception direction of a signal from a base station.

17. The terminal of claim 11, wherein the at least one first antenna is activated based on at least one of a best beam, a result of estimating an angle of arrival (AOA), an angle of the best beam, or strength of a received signal.

18. The terminal of claim 11,
    wherein the at least one processor is further configured to determine a reception direction of a signal at a default antenna, among the plurality of antennas, that is activated if the terminal is turned on, and
    wherein the at least one first antenna includes an antenna corresponding to the reception direction of the signal at the default antenna.

19. The terminal of claim 18, wherein the default antenna is arranged at a center of a front side or a rear side of the terminal.

20. The terminal of claim 11,
    wherein activation of the at least one first antenna and deactivation of the at least one second antenna are allowed during a non-data period, and
    wherein the non-data period includes a period in which at least one of a signal for synchronization or synchronization tracking, a signal for beam measurement or tracking, a signal used for automatic gain control (AGC), or a signal used for beam changing is received.

* * * * *